United States Patent
Machida et al.

(10) Patent No.: US 12,553,219 B2
(45) Date of Patent: Feb. 17, 2026

(54) WORK MACHINE SURROUNDINGS MONITORING SYSTEM, WORK MACHINE, AND WORK MACHINE SURROUNDINGS MONITORING METHOD

(71) Applicant: Komatsu Ltd., Tokyo (JP)

(72) Inventors: Masaomi Machida, Tokyo (JP); Yosuke Okumura, Tokyo (JP); Natsumi Tsuda, Tokyo (JP); Takeshi Kurihara, Tokyo (JP)

(73) Assignee: KOMATSU LTD., Tokyo (JP)

( * ) Notice: Subject to any disclaimer, the term of this patent is extended or adjusted under 35 U.S.C. 154(b) by 115 days.

(21) Appl. No.: 18/576,117

(22) PCT Filed: Sep. 20, 2022

(86) PCT No.: PCT/JP2022/034971
§ 371 (c)(1),
(2) Date: Jan. 3, 2024

(87) PCT Pub. No.: WO2023/048136
PCT Pub. Date: Mar. 30, 2023

(65) Prior Publication Data
US 2024/0240436 A1  Jul. 18, 2024

(30) Foreign Application Priority Data

Sep. 22, 2021  (JP) .................... 2021-154614

(51) Int. Cl.
*E02F 9/26* (2006.01)
*E02F 9/24* (2006.01)

(52) U.S. Cl.
CPC ............... *E02F 9/262* (2013.01); *E02F 9/24* (2013.01)

(58) Field of Classification Search
CPC . E02F 3/435; E02F 9/2033; E02F 9/24; E02F 9/262
See application file for complete search history.

(56) References Cited

U.S. PATENT DOCUMENTS 9,333,915 B2 *  5/2016  Nakanishi ................. B60R 1/27
9,836,938 B2 * 12/2017  Kiyota ...................... E02F 9/24
(Continued)

FOREIGN PATENT DOCUMENTS

JP          6662622 B2     3/2020
JP       2020-183623 A    11/2020
(Continued)

*Primary Examiner* — Tyler J Lee
(74) *Attorney, Agent, or Firm* — Troutman Pepper Locke LLP

(57) ABSTRACT

A surroundings monitoring system for a work machine includes: an object detection device that detects an object around the work machine including a cab; an external alarm device disposed outside the cab; an operator alarm device disposed inside the cab; and a processor. The processor sets, on the basis of input data for setting a control mode of the work machine from an input device, a control mode for controlling an operation of the work machine at a time when the object is detected to either an enabled mode in which at least a part of the operation of the work machine is restricted or a disabled mode in which the operation of the work machine is not restricted. The processor enables or disables the operator alarm device on the basis of the control mode that has been set.

16 Claims, 12 Drawing Sheets

(56) References Cited

U.S. PATENT DOCUMENTS

| | | | | |
|---|---|---|---|---|
| 11,225,777 B2* | 1/2022 | Kurokami | ................ | E02F 9/24 |
| 11,562,635 B2* | 1/2023 | Imaizumi | ................ | G01S 15/87 |
| 11,697,920 B2* | 7/2023 | Kiyota | .................... | E02F 9/26 |
| | | | | 382/103 |
| 2006/0044146 A1* | 3/2006 | Ferguson | ............... | G07C 5/008 |
| | | | | 340/572.1 |
| 2013/0088593 A1* | 4/2013 | Ishimoto | ................ | E02F 9/226 |
| | | | | 348/143 |
| 2014/0354813 A1* | 12/2014 | Ishimoto | ................ | G06T 11/60 |
| | | | | 348/148 |
| 2015/0183370 A1* | 7/2015 | Nakanishi | ............. | G08G 1/166 |
| | | | | 348/148 |
| 2016/0202351 A1* | 7/2016 | Uotsu | ................... | G01S 13/867 |
| | | | | 342/27 |
| 2018/0258616 A1 | 9/2018 | Kiyota et al. | | |
| 2020/0277757 A1* | 9/2020 | Kurokami | ................ | E02F 9/24 |
| 2020/0399863 A1 | 12/2020 | Aizawa et al. | | |
| 2021/0350681 A1* | 11/2021 | Imaizumi | ............... | G01S 13/931 |
| 2022/0154431 A1 | 5/2022 | Kurosawa | | |
| 2022/0333357 A1 | 10/2022 | Eguchi et al. | | |
| 2022/0364333 A1 | 11/2022 | Ushijima et al. | | |

FOREIGN PATENT DOCUMENTS

| | | |
|---|---|---|
| JP | 2021-014737 A | 2/2021 |
| JP | 2021-068948 A | 4/2021 |
| JP | 2021-070988 A | 5/2021 |
| WO | 2019/172424 A1 | 9/2019 |
| WO | 2021/025123 A1 | 2/2021 |

* cited by examiner

FIG.5

| | | |
|---|---|---|
| OPERATION MODE OF EXTERNAL BUZZER | ENABLED MODE | OUTPUT ALARM WHEN OBJECT IS DETECTED |
| | DISABLED MODE | DOES NOT OUTPUT ALARM EVEN WHEN OBJECT IS DETECTED |
| OPERATION MODE OF IN-CAB BUZZER | ENABLED MODE | OUTPUT ALARM WHEN OBJECT IS DETECTED |
| | DISABLED MODE | DOES NOT OUTPUT ALARM EVEN WHEN OBJECT IS DETECTED |
| CONTROL MODE OF VEHICLE BODY CONTROLLER | ENABLED MODE | RESTRICT OPERATION WHEN OBJECT IS DETECTED |
| | DISABLED MODE | DOES NOT RESTRICT OPERATION EVEN WHEN OBJECT IS DETECTED |

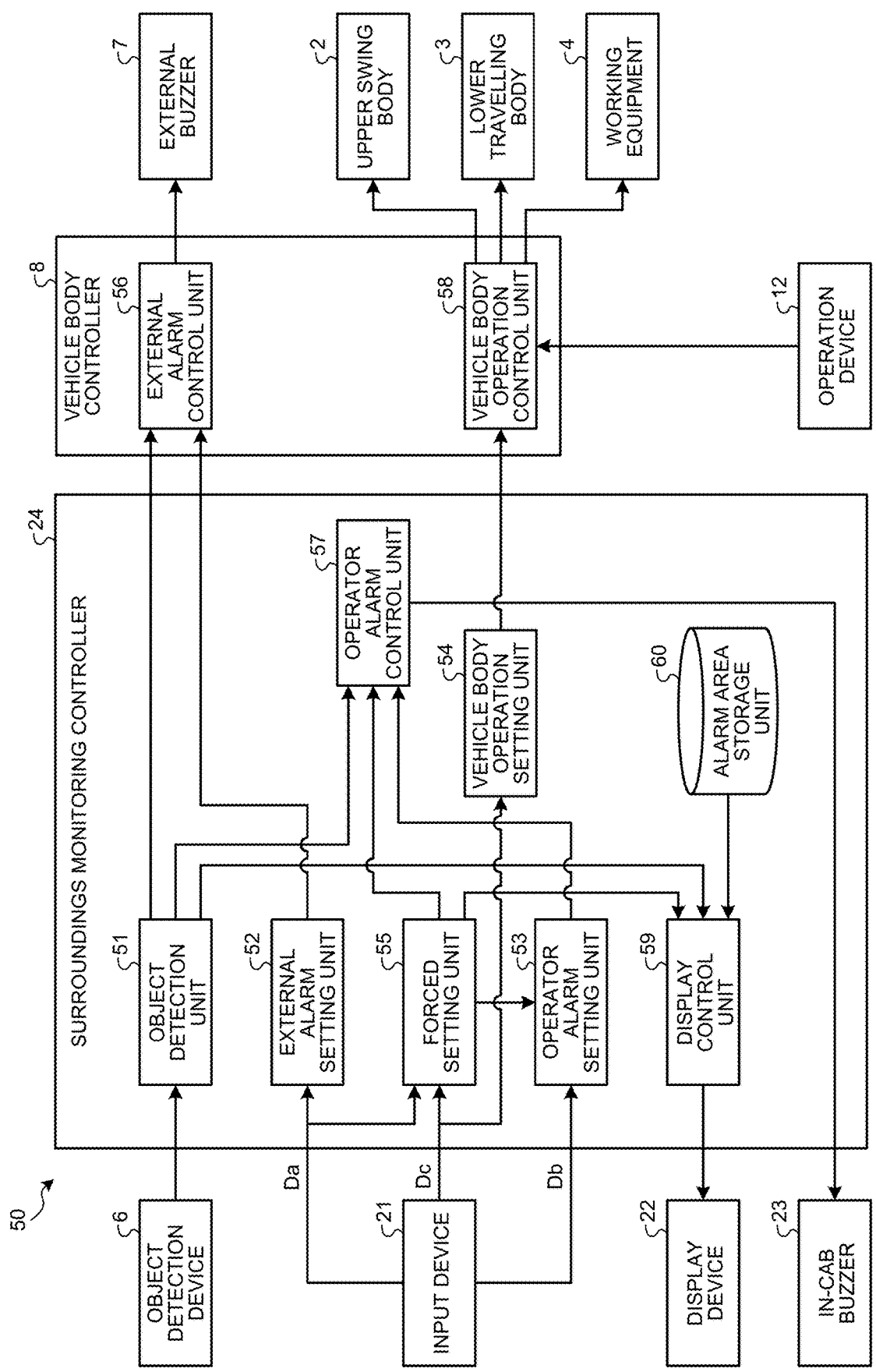

[WHETHER OR NOT OPERATOR CAN SET IN-CAB BUZZER]

|  |  | CONTROL MODE OF VEHICLE BODY OPERATION CONTROL UNIT | |
|---|---|---|---|
|  |  | ENABLED | DISABLED |
| OPERATION MODE OF EXTERNAL BUZZER | ENABLED | SETTING PROHIBITED (FORCIBLY ENABLED) | SETTING PROHIBITED (FORCIBLY ENABLED) |
|  | DISABLED | SETTING PROHIBITED (FORCIBLY ENABLED) | SETTING ALLOWED (ENABLED OR DISABLED) |

WORK MACHINE SURROUNDINGS MONITORING SYSTEM, WORK MACHINE, AND WORK MACHINE SURROUNDINGS MONITORING METHOD

FIELD

The technology disclosed herein relates to a work machine surroundings monitoring system, a work machine, and a work machine surroundings monitoring method.

BACKGROUND

In a technical field related to work machines, there is known a work machine including a surroundings monitoring device as disclosed in Patent Literature 1. In Patent Literature 1, in the surroundings monitoring device, the settings of an object detection function can be switched between ON and OFF. When an object is detected when the object detection function is set to ON, an alarm is output. In a case where the object detection function is set to OFF, no alarm is output, and thus the comfort of an operator of the work machine is improved.

CITATION LIST

Patent Literature

Patent Literature 1: JP 2021-014737 A

SUMMARY

Technical Problem

In a case where an operator can desirably set output and stop of the alarm, the alarm may be set inappropriately.

Solution to Problem

According to an aspect of the present invention, a surroundings monitoring system for a work machine, the surroundings monitoring system comprises: an object detection device that detects an object around the work machine; an operator alarm device disposed in such a manner as to output an alarm towards an operator operating the work machine; and a processor, wherein the processor: sets, on the basis of input data for setting a control mode of the work machine from an input device, a control mode for controlling an operation of the work machine at a time when the object is detected to either an enabled mode in which at least a part of the operation of the work machine is restricted or a disabled mode in which the operation of the work machine is not restricted; and enables or disables the operator alarm device on the basis of the control mode that has been set.

Advantageous Effects of Invention

According to the above aspect, inappropriate setting of the alarm is suppressed.

BRIEF DESCRIPTION OF DRAWINGS

FIG. 5 is a table for explaining an operation mode of an external buzzer, an operation mode of an in-cab buzzer, and a control mode of a vehicle body controller according to the embodiment.

FIG. 6 is a functional block diagram illustrating a surroundings monitoring system according to the embodiment.

DESCRIPTION OF EMBODIMENTS

Hereinafter, embodiments of the present disclosure will be described with reference to the drawings; however, the present disclosure is not limited thereto. Components of the embodiments described below can be combined as appropriate. Meanwhile, some of the components may not be used.

[Work Machine]

Figure 1:
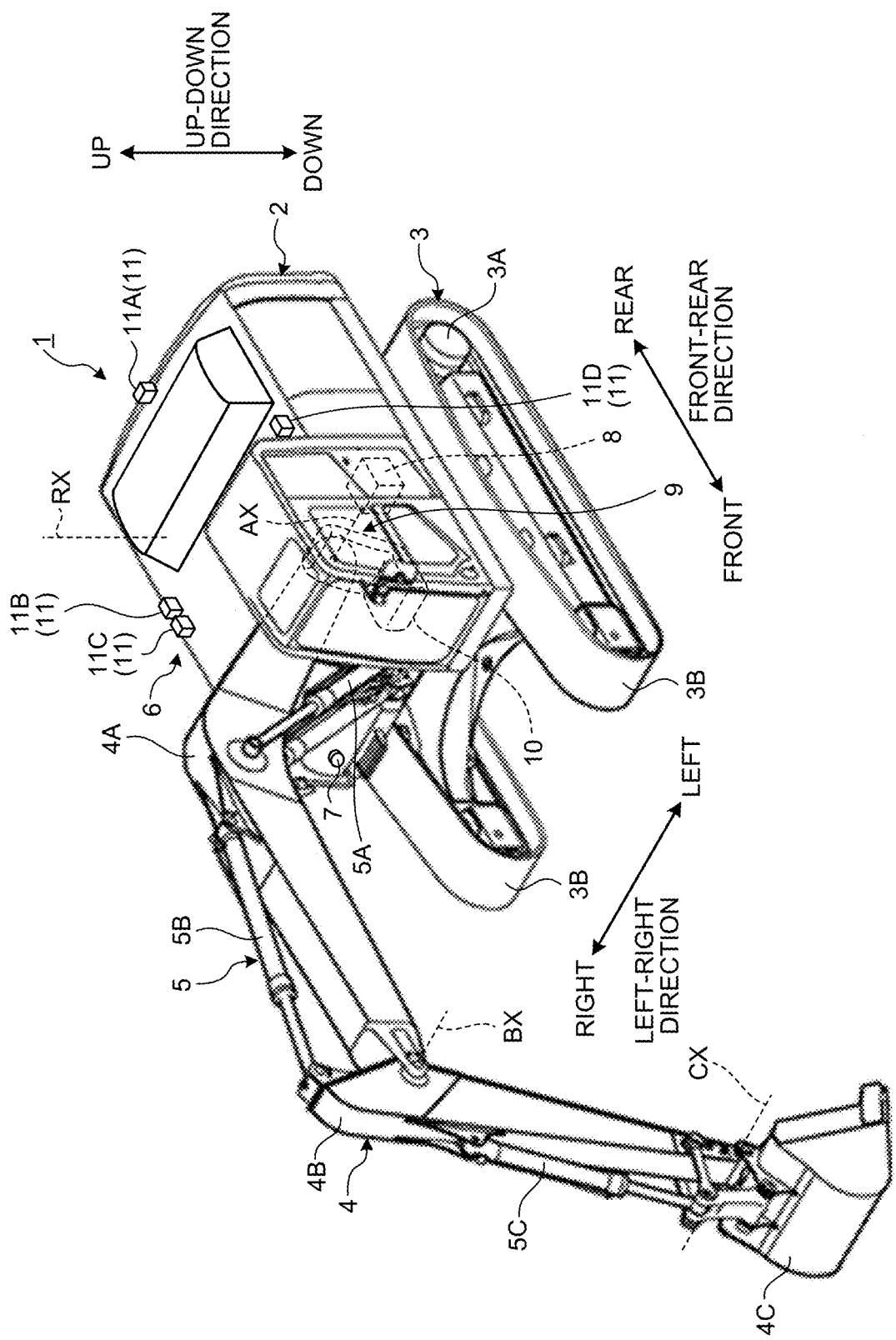
FIG. 1 is a perspective view illustrating a work machine according to an embodiment.

FIG. 1 is a perspective view illustrating a work machine 1 according to an embodiment. In the embodiment, it is based on the premise that the work machine 1 is an excavator. In the following description, the work machine 1 is referred to as an excavator 1 as appropriate.

As illustrated in FIG. 1, the excavator 1 includes an upper swing body 2, a lower travelling body 3, working equipment 4, a hydraulic cylinder 5, an object detection device 6, an external alarm device 7, and a vehicle body controller 8.

The upper swing body 2 is swingably supported by the lower travelling body 3. The upper swing body 2 swings about a swinging axis RX. The upper swing body 2 supports the working equipment 4. The upper swing body 2 has a cab 9. An operator of the excavator 1 boards the cab 9. A driver's seat 10 on which an operator is seated is included in the cab 9.

The lower travelling body 3 travels while supporting the upper swing body 2. The lower travelling body 3 includes driving wheels 3A and crawler belts 3B. With the driving wheels 3A rotating, the crawler belts 3B are rotated. With the crawler belts 3B rotating, the lower travelling body 3 travels.

The working equipment 4 is connected by the upper swing body 2. The working equipment 4 includes a boom 4A, an arm 4B, and a bucket 4C. The boom 4A is connected to the upper swing body 2 in such a manner as to be rotatable about a boom rotation axis AX. The arm 4B is connected to the boom 4A in such a manner as to be rotatable about an arm rotation axis BX. The bucket 4C is connected to the arm 4B in such a manner as to be rotatable about a bucket rotation axis CX.

The boom rotation axis AX, the arm rotation axis BX, and the bucket rotation axis CX are parallel to each other. An axis parallel to the boom rotation axis AX and the swinging axis RX are orthogonal to each other. In the embodiment, a direction parallel to the swinging axis RX is referred to as an up-down direction as appropriate, a direction parallel to the boom rotation axis AX is referred to as a left-right direction as appropriate, and a direction orthogonal to both the boom rotation axis AX and the swinging axis RX is referred to as a front-rear direction as appropriate. A direction in which the bucket 4C is present with respect to the operator seated on the driver's seat 10 is the front, and a direction opposite to the front is the rear. A direction in which the boom 4A is present with respect to the operator seated on the driver's seat 10 is the right direction, and a direction opposite to the right direction is the left direction. A direction away from the ground contact surface of the lower travelling body 3 is an upward direction, and a direction opposite to the upward direction is the downward direction.

The hydraulic cylinder 5 generates power for causing the working equipment 4 to operate. The hydraulic cylinder 5 includes a boom cylinder 5A, an arm cylinder 5B, and a bucket cylinder 5C. The boom cylinder 5A causes the boom 4A to operate. The arm cylinder 5B causes the arm 4B to operate. The bucket cylinder 5C causes the bucket 4C to operate.

The object detection device 6 detects an object around the excavator 1. The object detection device 6 includes cameras 11 that captures images of the surroundings of the excavator 1. The plurality of cameras 11 is provided to the upper swing body 2. The cameras 11 include a rear camera 11A provided at the rear of the upper swing body 2, a right side camera 11B and a right front camera 11C provided at the right portion of the upper swing body 2, and a left side camera 11D provided at the left portion of the upper swing body 2.

The rear camera 11A captures an image of the rear of the upper swing body 2. The right side camera 11B captures an image of the right side and the right rear of the upper swing body 2. The right front camera 11C captures an image of the right front of the upper swing body 2. The left side camera 11D captures an image of the left side and the left rear of the upper swing body 2. Each of the plurality of cameras 11 includes an optical system and an image sensor. The image sensor includes a couple charged device (CCD) image sensor or a complementary metal oxide semiconductor (CMOS) image sensor.

The external alarm device 7 is a device for outputting an alarm to the outside of the work machine. In the embodiment, the external alarm device 7 is disposed on the outer surface of the upper swing body 2. In the embodiment, the external alarm device 7 is disposed outside the cab 9. The external alarm device 7 includes a buzzer that outputs alarm sound as an alarm. The external alarm device 7 outputs an alarm toward the surroundings of the excavator 1. For example, in a case where there is a person around the excavator 1, the external alarm device 7 outputs an alarm to the person present around the excavator 1. In the following description, the external alarm device 7 is referred to as an external buzzer 7 as appropriate.

The vehicle body controller 8 includes a computer system. The vehicle body controller 8 controls each of the upper swing body 2, the lower travelling body 3, the working equipment 4, and the external buzzer 7.

[Cab]

Figure 2:
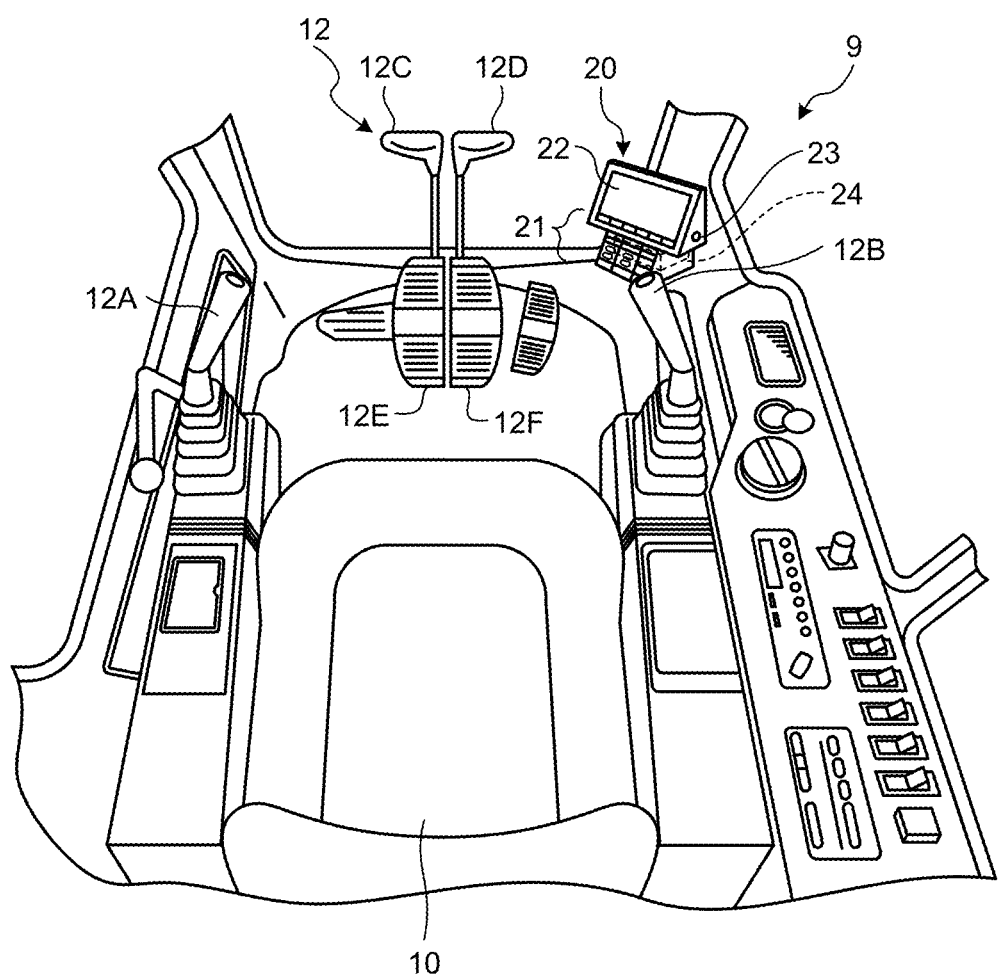
FIG. 2 is a diagram illustrating a cab of the excavator according to the embodiment.

FIG. 2 is a diagram illustrating the cab 9 of the excavator 1 according to the embodiment. As illustrated in FIG. 2, the driver's seat 10 on which the operator of the excavator 1 is seated is included in the cab 9.

The excavator 1 includes operation devices 12 arranged in the cab 9. The operation devices 12 are operated by the operator onboard the cab 9. The operation devices 12 are operated to operate at least a part of the excavator 1. The excavator 1 can be operated on the basis of the operation of the operation devices 12. The vehicle body controller 8 controls the operation of the excavator 1 on the basis of the operation of the operation devices 12. The operation of the excavator 1 includes at least one of a swinging operation of the upper swing body 2, a travelling operation of the lower travelling body 3, and a working operation of the working equipment 4.

The operation devices 12 include a left working lever 12A, a right working lever 12B, a left travelling lever 12C, a right travelling lever 12D, a left foot pedal 12E, and a right foot pedal 12F.

The left working lever 12A and the right working lever 12B are operated for a swinging operation of the upper swing body 2 and a working operation of the working equipment 4. With the left working lever 12A operated in the front-rear direction, the arm 4B performs a dumping operation or an excavating operation. With the left working lever 12A operated in the left-right direction, the upper swing body 2 swings left or right. With the right working lever 12B operated in the left-right direction, the bucket 4C performs the excavation operation or the dumping operation. With the right working lever 12B operated in the front-rear direction, the boom 4A is lowered or raised.

The left travelling lever 12C and the right travelling lever 12D are operated for the travelling operation of the lower travelling body 3. With the left travelling lever 12C operated in the front-rear direction, a crawler belt 3B on the left side of the lower travelling body 3 travels forward or backward. With the right travelling lever 12D operated in the front-rear direction, a crawler belt 3B on the right side of the lower travelling body 3 travels forward or backward. The left foot pedal 12E is interlocked with the left travelling lever 12C. The right foot pedal 12F is interlocked with the right travelling lever 12D. The lower travelling body 3 may be caused to travel forward or backward by operating the left foot pedal 12E and the right foot pedal 12F.

The excavator 1 includes a surroundings monitoring monitor 20 disposed in the cab 9. The surroundings monitoring monitor 20 is disposed on the right front side of the driver's seat 10. The surroundings monitoring monitor 20 includes an input device 21, a display device 22, an operator alarm device 23, and a surroundings monitoring controller 24.

The input device 21 is operated by the operator onboard the cab 9. In the embodiment, the input device 21 includes a plurality of push buttons. The input device 21 generates input data by being operated by the operator.

The display device 22 displays displayed data. The display device 22 includes a flat panel display such as a liquid crystal display (LCD) or an organic electroluminescence (EL) display (OLED).

The operator alarm device 23 is a device for outputting an alarm to the operator who operates the work machine. The operator alarm device 23 includes a buzzer that outputs alarm sound as an alarm. In the embodiment, the operator alarm device 23 is disposed inside the cab 9. The operator alarm device 23 outputs the alarm toward the inside of the cab 9. In a case where the operator of the excavator 1 is present in the cab 9, the operator alarm device 23 outputs the alarm towards the operator. In the following description, the operator alarm device 23 is referred to as an in-cab buzzer 23 as appropriate.

The surroundings monitoring controller 24 includes a computer system. The surroundings monitoring controller 24 controls each of the input device 21, the display device 22, and the in-cab buzzer 23.

The surroundings monitoring controller 24 performs arithmetic processing and image processing. Image data acquired by the cameras 11 is subjected to image processing by the surroundings monitoring controller 24.

[Detection Area and Alarm Areas]

Figure 3:
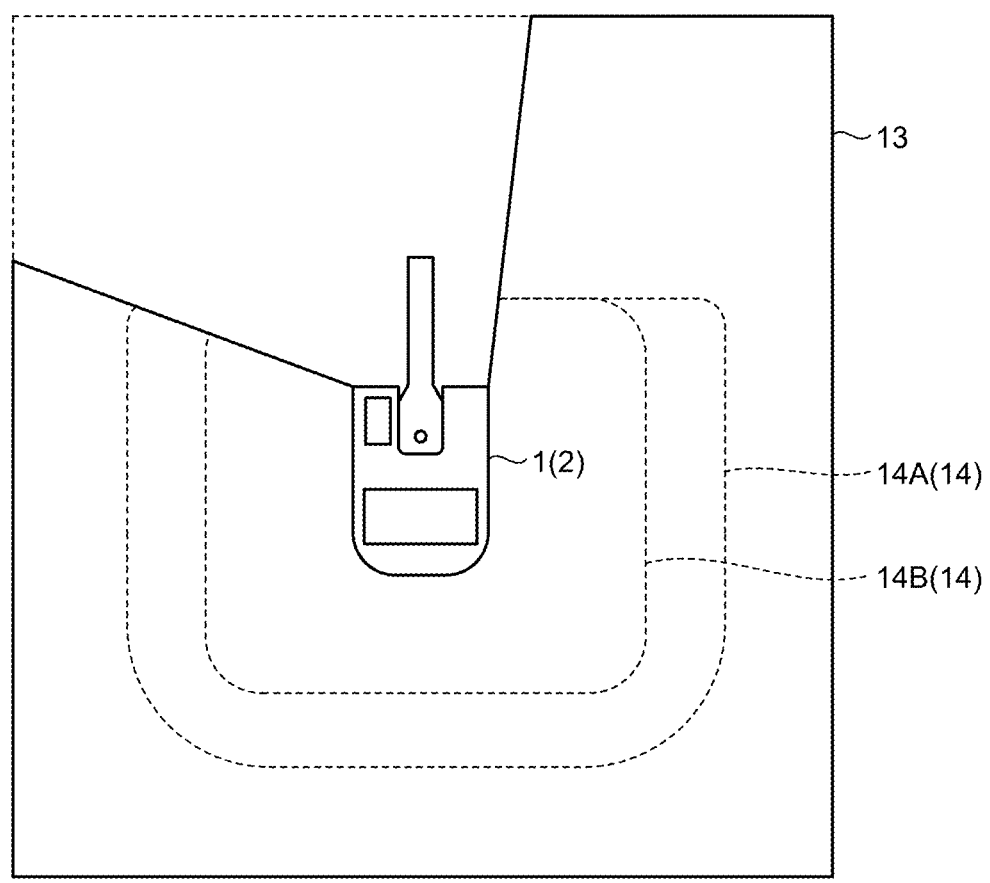
FIG. 3 is a schematic diagram illustrating a detection area and alarm areas according to the embodiment.

FIG. 3 is a schematic diagram illustrating a detection area 13 and alarm areas 14 according to the embodiment. The detection area 13 and the alarm areas 14 are defined around the excavator 1.

The detection area 13 is a detection area of the object detection device 6. The object detection device 6 detects an object present in the detection area 13. Examples of the object detected by the object detection device 6 include a person and an obstacle.

In the embodiment, the detection area 13 of the object detection device 6 includes the areas of field of view (area where imaging can be performed) of the cameras 11. The cameras 11 capture an image of the detection area 13 and acquires image data of the detection area 13. The surroundings monitoring controller 24 can detect an object present in the detection area 13 of the object detection device 6 by performing image processing on the image data acquired by the cameras 11.

Note that, in the embodiment, there is no detection area 13 in front and left front of the cab 9. The operator seated on the driver's seat 10 can directly visually recognize the situation in front of and left front of the cab 9. Therefore, the excavator 1 is not provided with a camera 11 that acquires image data indicating front and left front of the cab 9. As a result, the number of cameras 11 provided to the excavator 1 can be reduced. Note that a camera 11 that acquires image data indicating front and left front of the cab 9 may be provided.

The alarm areas 14 are areas in which an alarm is required to be output from at least one of the external buzzer 7 or the in-cab buzzer 23 when an object is detected by the object detection device 6. The alarm areas 14 are smaller than the detection area 13. The alarm areas 14 are set to include the excavator 1. The alarm areas 14 are set inside the detection area 13.

In the embodiment, the alarm areas 14 includes a first alarm area 14A and a second alarm area 14B. Each of the first alarm area 14A and the second alarm area 14B has a substantially rectangular shape. The second alarm area 14B is set to include the excavator 1. The second alarm area 14B is smaller than the first alarm area 14A. The second alarm area 14B is defined inside the first alarm area 14A.

[Surroundings Monitoring Monitor]

Figure 4:
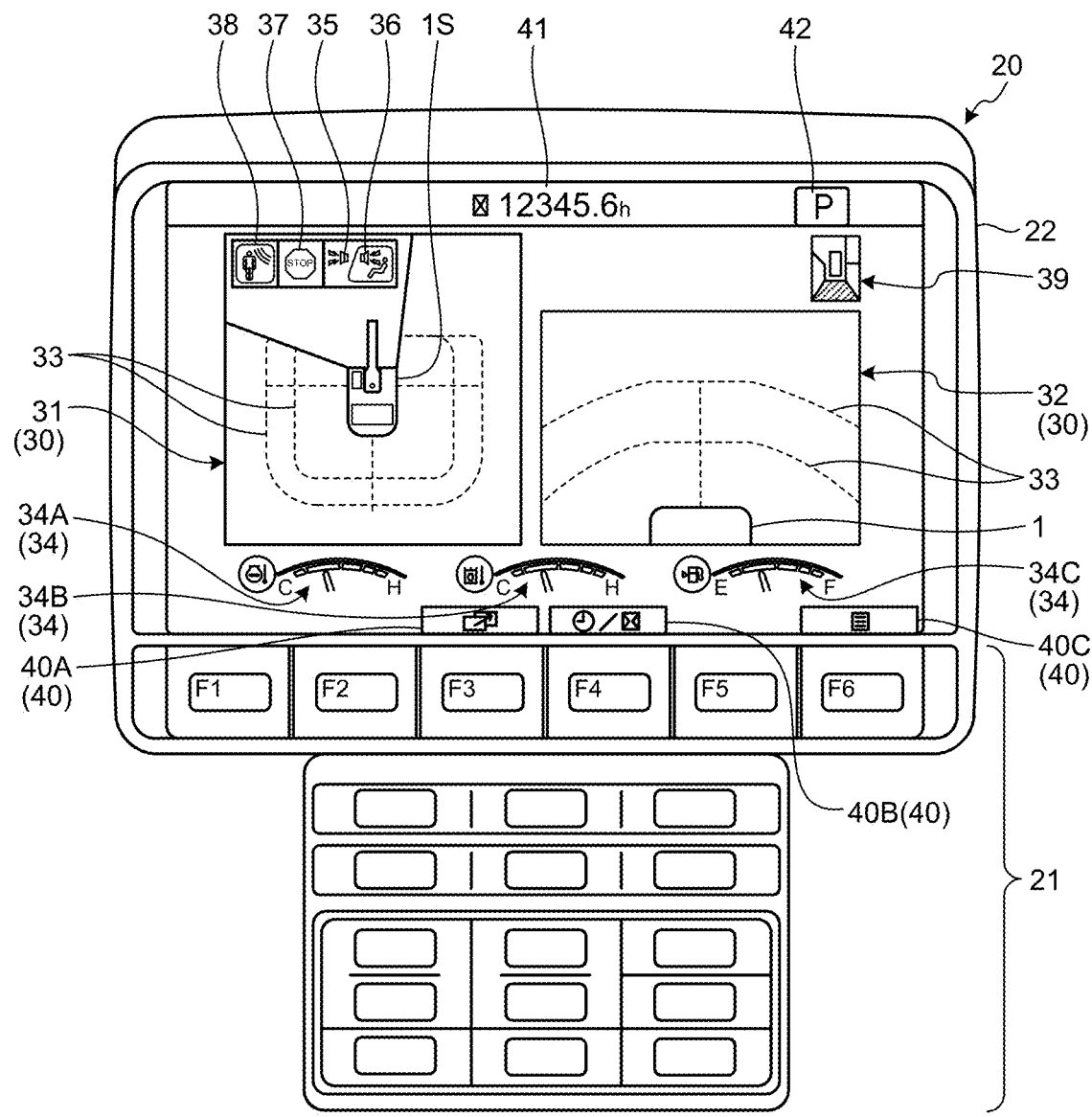
FIG. 4 is a diagram illustrating a surroundings monitoring monitor according to the embodiment.

FIG. 4 is a diagram illustrating the surroundings monitoring monitor 20 according to the embodiment. As illustrated in FIG. 4, the surroundings monitoring monitor 20 includes an input device 21 and a display device 22.

In the example illustrated in FIG. 4, the display device 22 displays surroundings images 30 indicating the surroundings of the excavator 1 and reference lines 33 indicating the alarm areas 14.

The surroundings images 30 indicate the situation around the excavator 1. The surroundings images 30 include at least one of a bird's eye image 31 or a single camera image 32 around the excavator 1.

The bird's eye image 31 is an image generated by changing the viewpoint of a plurality of pieces of image data acquired by the respective cameras 11 to that from above and combining the plurality of pieces of image data.

The single camera image 32 refers to an image of a part of the surroundings of the excavator 1 acquired by one of the plurality of cameras 11. In the example illustrated in FIG. 4, the single camera image 32 is a single camera image indicating a situation behind the excavator 1 acquired by the rear camera 11A.

In the example illustrated in FIG. 4, the bird's eye image 31 and the single camera image 32 are arranged in the left-right direction on a display screen of the display device 22. The bird's eye image 31 is arranged on the left side of the single camera image 32.

As illustrated in FIG. 4, the display device 22 displays a vehicle body symbol 1S indicating the excavator 1 together with the bird's eye image 31. The vehicle body symbol 1S corresponds to an image of the excavator 1 viewed from above. The positional relationship between the excavator 1 and the surroundings of the excavator 1 is clarified by the vehicle body symbol 1S.

The reference lines 33 indicate the alarm areas 14 in the surroundings image 30. The reference lines 33 also indicate references of the distance and the direction from the upper swing body 2. In the bird's eye image 31, the reference lines 33 are displayed around the vehicle body symbol 1S. In the single camera image 32, the reference lines 33 are displayed on at least a part of the surroundings of the excavator 1.

In addition, the display device 22 displays state symbols 34 indicating the state of the excavator 1. The state symbols 34 are displayed below the surroundings image 30. The state symbols 34 include a water temperature gauge 34A indicating the temperature of cooling water of the engine, an oil temperature gauge 34B indicating the temperature of hydraulic oil of a hydraulic device, and a fuel level gauge 34C indicating the level of the remaining amount of fuel.

The display device 22 also displays a first symbol 35, a second symbol 36, a third symbol 37, and a fourth symbol 38. Each of the first symbol 35, the second symbol 36, the third symbol 37, and the fourth symbol 38 is displayed in the upper left part of the bird's eye image 31.

The first symbol 35 indicates a setting status of the operation mode of the external buzzer 7. The second symbol 36 indicates a setting status of the operation mode of the in-cab buzzer 23. The third symbol 37 indicates a setting status of the control mode of the vehicle body controller 8. The fourth symbol 38 indicates an object detection status by the object detection device 6.

In addition, the display device 22 displays a direction symbol 39 indicating the direction from the excavator 1 of the single camera image 32 displayed on the display device 22. The direction symbol 39 is displayed on the upper right of the single camera image 32. The direction symbol 39 has four discrimination regions each corresponding to one of the rear camera 11A, the right side camera 11B, the right front camera 11C, and the left side camera 11D. In a case where the single camera image 32 captured by a certain camera 11 among the four cameras 11 is displayed on the display device 22, one discrimination region corresponding to the camera 11 that has captured the single camera image 32 displayed on the display device 22 among the four discrimination regions of the direction symbol 39 is highlighted. In the example illustrated in FIG. 4, since the single camera image 32 displayed on the display device 22 is a single camera image captured by the rear camera 11A, the discrimination region corresponding to the rear camera 11A is highlighted.

The display device 22 also displays a service meter symbol 41 indicating the value of a service meter and a work mode symbol 42 indicating the setting status of the work mode. The service meter symbol 41 and the work mode symbol 42 are displayed above the surroundings image 30.

The input device 21 includes a plurality of function buttons F (F1, F2, F3, F4, F5, and F6) arranged below the display screen of the display device 22. A specific function is assigned to each of the plurality of function buttons F. A plurality of function symbols 40 is displayed at a lower part of the display screen of the display device 22. The function symbols 40 are displayed immediately above the function buttons F. When a function button F is operated by the operator, input data of a specific function corresponding to a function symbol 40 displayed immediately above the function button F is generated. In the example illustrated in FIG. 4, the function symbols 40 include a function symbol 40A displayed immediately above the function button F3, a function symbol 40B displayed immediately above the function button F4, and a function symbol 40C displayed immediately above the function button F6.

[Operation Mode and Control Mode]

FIG. 5 is a table for explaining the operation mode of the external buzzer 7, the operation mode of the in-cab buzzer 23, and the control mode of the vehicle body controller 8 according to the embodiment. The operator can set each of the operation mode of the external buzzer 7, the operation mode of the in-cab buzzer 23, and the control mode of the vehicle body controller 8 by operating the input device 21. Note that the control mode of the vehicle body controller 8 is synonymous with the control mode of a vehicle body operation control unit 58 described later.

The operation mode of the external buzzer 7 includes an enabled mode in which the alarm is output when an object is detected by the object detection device 6 in the alarm areas 14 and a disabled mode in which the alarm is not output even when an object is detected.

The operation mode of the in-cab buzzer 23 includes an enabled mode in which the alarm is output when an object is detected by the object detection device 6 in the alarm areas 14 and a disabled mode in which the alarm is not output even when an object is detected.

The control mode of the vehicle body controller 8 includes an enabled mode in which at least a part of the operation of the excavator 1 is restricted when an object is detected by the object detection device 6 in the alarm areas 14 and a disabled mode in which the operation of the excavator 1 is not restricted even when an object is detected.

The operator can set the operation mode of the external buzzer 7 at the time when an object is detected in the alarm areas 14 to either the enabled mode or the disabled mode by operating the input device 21. With the input device 21 operated, first input data Da for setting the operation mode of the external buzzer 7 is generated. The surroundings monitoring controller 24 sets the operation mode of the external buzzer 7 at the time when an object is detected in the alarm areas 14 to either the enabled mode or the disabled mode on the basis of the first input data Da from the input device 21.

The operator can set the operation mode of the in-cab buzzer 23 at the time when an object is detected in the alarm areas 14 to either the enabled mode or the disabled mode by operating the input device 21. With the input device 21 operated, second input data db for setting the operation mode of the in-cab buzzer 23 is generated. The surroundings monitoring controller 24 sets the operation mode of the in-cab buzzer 23 at the time when an object is detected in the alarm areas 14 to either the enabled mode or the disabled mode on the basis of the second input data db from the input device 21.

The operator can set the control mode of the vehicle body controller 8 at the time when an object is detected in the alarm areas 14 to either the enabled mode or the disabled mode by operating the input device 21. With the input device 21 operated, third input data Dc for setting the control mode of the vehicle body controller 8 is generated. The surroundings monitoring controller 24 sets the control mode of the vehicle body controller 8 at the time when an object is detected in the alarm areas 14 to either the enabled mode or the disabled mode on the basis of the third input data Dc from the input device 21.

With the operation mode of the external buzzer 7 set to the enabled mode, in a case where there is a person in the alarm areas 14 around the excavator 1, the external buzzer 7 outputs the alarm. The person present in the alarm areas 14 can recognize that the person is approaching the excavator 1 on the basis of the alarm output from the external buzzer 7.

With the operation mode of the external buzzer 7 set to the disabled mode, even in a case where there is a person in the alarm areas 14 around the excavator 1, the external buzzer 7 does not output the alarm. For example, in a case where the person present around the excavator 1 is sufficiently aware of the work situation of the excavator 1, if the alarm is output from the external buzzer 7, the person present around the excavator 1 may feel annoyed. That is, depending on the situation around the excavator 1, there may be scenes in which it is not essential to output the alarm from the external buzzer 7. In order to suppress the output of an unnecessary alarm from the external buzzer 7, the operator can set the operation mode of the external buzzer 7 to the disabled mode by operating the input device 21.

With the operation mode of the in-cab buzzer 23 set to the enabled mode, in a case where there is a person in the alarm areas 14 around the excavator 1, the in-cab buzzer 23 outputs the alarm. The operator of the excavator 1 present in the cab 9 can recognize that a person is present in the alarm areas 14 on the basis of the alarm output from the in-cab buzzer 23.

With the operation mode of the in-cab buzzer 23 set to the disabled mode, in a case where there is a person in the alarm areas 14 around the excavator 1, the in-cab buzzer 23 does not output the alarm. For example, in a case where the operator is sufficiently aware of the situation around the excavator 1, if the alarm is output from the in-cab buzzer 23, the operator may feel annoyed. That is, depending on the situation of the work of the excavator 1, there may be scenes in which it is not essential to output the alarm from the in-cab buzzer 23. In order to suppress the output of an unnecessary alarm from the in-cab buzzer 23, the operator can set the operation mode of the in-cab buzzer 23 to the disabled mode by operating the input device 21.

With the control mode of the vehicle body controller 8 set to the enabled mode, in a case where a person is present in the alarm areas 14 around the excavator 1, the vehicle body controller 8 restricts at least a part of the operation of the excavator 1. The restriction of the operation of the excavator 1 includes at least one of restriction of the swinging operation of the upper swing body 2, restriction of the travelling operation of the lower travelling body 3, and restriction of the working operation of the working equipment 4. Even when the operation devices 12 are operated by the operator, the vehicle body controller 8 disables the operation of the operation devices 12 and restricts the operation of the excavator 1. For example, in a case where the output pressure of the hydraulic oil is adjusted by an operation of an operation device 12 and the hydraulic oil supplied to a hydraulic actuator that causes the excavator 1 to operate is adjusted on the basis of the output pressure of the operation device 12, the vehicle body controller 8 can disable the operation of the operation device 12 by controlling a valve capable of blocking the output pressure of the operation device 12. For example, in a case where a person is present in the alarm areas 14, the vehicle body controller 8 restricts the travelling operation of the lower travelling body 3 even when the operation devices 12 are operated in such a manner that the lower travelling body 3 travels. For example, even when the operation devices 12 are operated to start travelling of the lower travelling body 3, the vehicle body controller 8 performs start lock control that prohibits the lower travelling body 3 from start travelling. Moreover, in the case where the person is present in the alarm areas 14, the vehicle body controller 8 performs stop control to stop the lower travelling body 3 even when the operation devices 12 are operated in such a manner that the travelling of the lower travelling body 3 is maintained. Note that, in the case where the person is present in the alarm areas 14, the vehicle body controller 8 may restrict the swinging operation of the upper swing body 2 even when the operation device 12 is operated in such a manner that the upper swing body 2 swings. In the case where the person is present in the alarm areas 14, the vehicle body controller 8 may restrict the work operation of the working equipment 4 even when the operation devices 12 are operated in such a manner that the working equipment 4 performs the working operation.

With the control mode of the vehicle body controller 8 set to the disabled mode, even in a case where a person is present in the alarm areas 14 around the excavator 1, the vehicle body controller 8 does not restrict the operation of the excavator 1. The vehicle body controller 8 causes the excavator 1 to operate on the basis of the operation of the operation devices 12. The excavator 1 operates on the basis of the operation of the operation devices 12 by the operator. For example, in a case where the operator is sufficiently aware of the situation around the excavator 1, if the operation of the excavator 1 is restricted, there is a possibility that the operator feels annoyed or that the working efficiency drops. That is, depending on the situation of the work of the excavator 1, there may be scenes in which it is not essential to restrict the operation of the excavator 1. In order to suppress unnecessary restriction of the operation of the excavator 1, the operator can operate the input device 21 to set the control mode of the vehicle body controller 8 to the disabled mode.

Note that, in the embodiment, in a case where the operation mode of the external buzzer 7 is set to the enabled mode, the alarm is output from the external buzzer 7 due to the presence of a person (object) inside the first alarm area 14A or inside the second alarm area 14B. In a case where the operation mode of the in-cab buzzer 23 is set to the enabled mode, the alarm is output from the external buzzer 7 due to the presence of a person (object) inside the first alarm area 14A or inside the second alarm area 14B. In a case where the control mode of the vehicle body controller 8 is set to the enabled mode, at least a part of the operation of the excavator 1 is restricted due to the presence of a person (object) inside the second alarm area 14B.

[Surroundings Monitoring System]

FIG. 6 is a functional block diagram illustrating a surroundings monitoring system 50 according to the embodiment. The excavator 1 includes the surroundings monitoring system 50. The surroundings monitoring system 50 monitors the surroundings of the excavator 1.

The surroundings monitoring system 50 includes the object detection device 6, the input device 21, the display device 22, the in-cab buzzer 23, the surroundings monitoring controller 24, the vehicle body controller 8, and the external buzzer 7.

The surroundings monitoring system 50 includes an object detection unit 51, an external alarm setting unit 52, an operator alarm setting unit 53, a vehicle body operation setting unit 54, a forced setting unit 55, an external alarm control unit 56, an operator alarm control unit 57, a vehicle body operation control unit 58, a display control unit 59, and an alarm area storage unit 60. In the embodiment, the surroundings monitoring controller 24 has functions of each of the object detection unit 51, the external alarm setting unit 52, the operator alarm setting unit 53, the vehicle body operation setting unit 54, the forced setting unit 55, the operator alarm control unit 57, the display control unit 59, and the alarm area storage unit 60, and the vehicle body controller 8 has functions of each of the external alarm control unit 56 and the vehicle body operation control unit 58.

The object detection unit 51 detects an object present around the excavator 1 on the basis of detection data of the object detection device 6. In the embodiment, the detection data of the object detection device 6 includes image data around the excavator 1 captured by the cameras 11. The object detection unit 51 acquires the image data from the cameras 11. The object detection unit 51 detects an object present around the excavator 1 on the basis of the image data. The object detection unit 51 can determine whether or not an object is present around the excavator 1 by performing image processing on the image data.

The external alarm setting unit 52 sets the operation mode of the external buzzer 7 at the time when an object is detected in the alarm areas 14 to either the enabled mode in which the alarm is output or the disabled mode in which the alarm is not output on the basis of the first input data Da from the input device 21.

The operator alarm setting unit 53 sets the operation mode of the in-cab buzzer 23 at the time when an object is detected in the alarm areas 14 to either the enabled mode in which the alarm is output or the disabled mode in which the alarm is not output on the basis of the second input data db from the input device 21.

The vehicle body operation setting unit 54 sets the control mode of the vehicle body operation control unit 58 at the time when an object is detected in the alarm areas 14 to either the enabled mode in which at least a part of the operation of the excavator 1 is restricted or the disabled mode in which the operation of the excavator 1 is not restricted on the basis of the third input data Dc from the input device 21.

In a case where the operation mode of the external buzzer 7 is set to the enabled mode on the basis of the first input data Da, the forced setting unit 55 prohibits setting of the operation mode of the in-cab buzzer 23 by the operator alarm setting unit 53 and forcibly sets the operation mode of the in-cab buzzer 23 to the enabled mode.

Furthermore, in a case where the control mode of the vehicle body operation control unit 58 is set to the enabled mode on the basis of the third input data Dc, the forced setting unit 55 prohibits setting of the operation mode of the in-cab buzzer 23 by the operator alarm setting unit 53 and forcibly sets the operation mode of the in-cab buzzer 23 to the enabled mode.

The external alarm control unit 56 controls the operation of the external buzzer 7. The external alarm control unit 56 controls the operation of the external buzzer 7 on the basis of the operation mode set by the external alarm setting unit 52.

The operator alarm control unit 57 controls the operation of the in-cab buzzer 23. The operator alarm control unit 57 controls the operation of the in-cab buzzer 23 on the basis of the operation mode set by the operator alarm setting unit 53 or the forced setting unit 55.

The vehicle body operation control unit 58 controls the operation of the excavator 1. The vehicle body operation control unit 58 controls the operation of the excavator 1 on the basis of the operation of the operation devices 12. The vehicle body operation control unit 58 controls the operation of the excavator 1 on the basis of the control mode set by the vehicle body operation setting unit 54.

The display control unit 59 causes the display device 22 to display displayed data.

The alarm area storage unit 60 stores the alarm areas 14 in which output of the alarm is requested when an object is detected.

[Display Control Unit]

Figure 7:
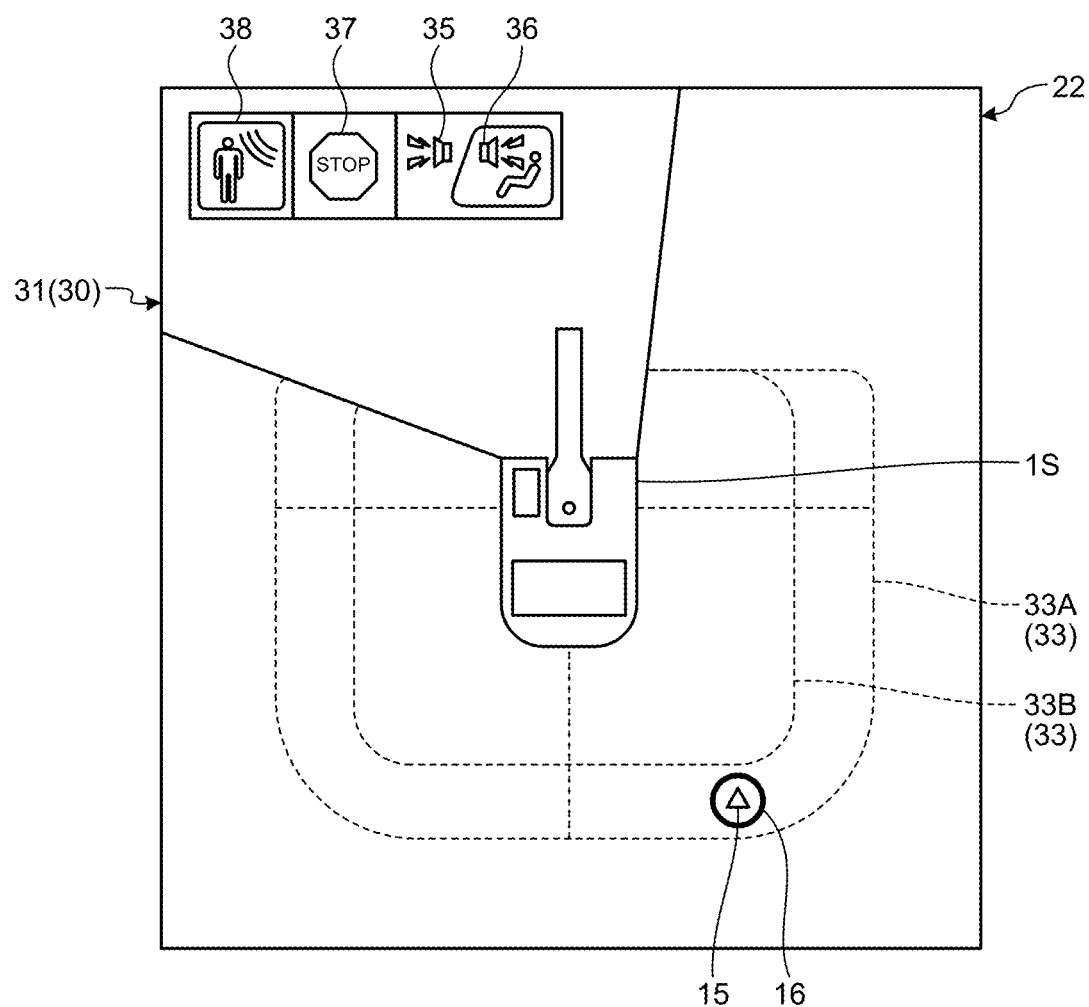
FIG. 7 is a diagram illustrating exemplary display of a display device according to the embodiment.

FIG. 7 is a diagram illustrating exemplary display of the display device 22 according to the embodiment. The display control unit 59 generates a surroundings image 30 indicating the surroundings of the excavator 1 on the basis of the image data captured by the object detection device 6. The display control unit 59 causes the display device 22 to display the surroundings image 30 and the reference lines 33 indicating the alarm areas 14 in the surroundings image 30.

As described above, the surroundings images 30 include the bird's eye image 31 of the surroundings of the excavator 1 and the single camera image 32 of the surroundings of the excavator 1. As illustrated in FIG. 7, the display control unit 59 causes the display device 22 to display the bird's eye image 31 indicating the surroundings of the excavator 1 and the reference lines 33 arranged in at least a part of the surroundings of the vehicle body symbol 1S in the bird's eye image 31. The reference lines 33 indicate the alarm areas 14 in the bird's eye image 31.

The reference lines 33 are displayed to include the vehicle body symbol 1S. In the embodiment, the reference lines 33 include a first reference line 33A indicating the first alarm area 14A and a second reference line 33B indicating the second alarm area 14B. The vehicle body symbol 1S is displayed inside the second reference line 33B. The second reference line 33B is displayed inside the first reference line 33A. A region surrounded by the second reference line 33B is smaller than a region surrounded by the first reference line 33A.

In the embodiment, each of the first reference line 33A and the second reference line 33B has a substantially rectangular shape. The front end of the first reference line 33A coincides with the front end of the second reference line 33B. The rear end of the first reference line 33A is defined behind the rear end of the second reference line 33B. The left end of the first reference line 33A is defined on the left of the left end of the second reference line 33B. The right end of the first reference line 33A is defined on the right of the right end of the second reference line 33B.

In a case where the object detection unit 51 detects an object 15 inside an alarm area 14, the display control unit 59 causes the display device 22 to display a marker 16 in such a manner as to overlap the object 15 displayed in the bird's eye image 31. The marker 16 is a symbol that highlights the object 15 present in the alarm area 14 on the display screen of the display device 22.

Figure 8:
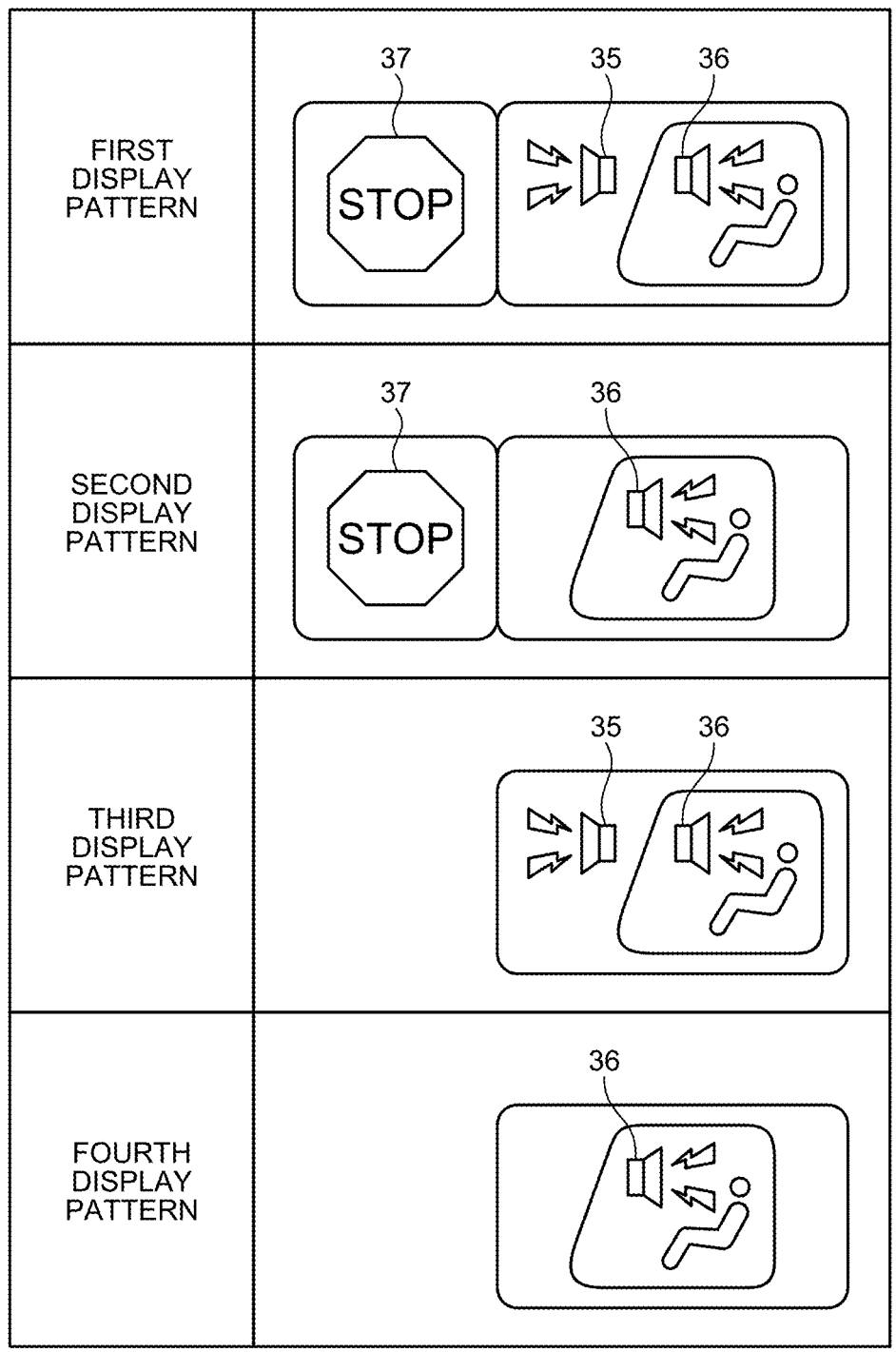
FIG. 8 is a diagram illustrating exemplary display of a display device according to the embodiment.

FIG. 8 is a diagram illustrating exemplary display of the display device 22 according to the embodiment. As illustrated in FIGS. 4, 7, and 8, the display control unit 59 causes the display device 22 to display the first symbol 35 indicating the operation mode of the external buzzer 7, the second symbol 36 indicating the operation mode of the in-cab buzzer 23, and the third symbol 37 indicating the control mode of the vehicle body operation control unit 58.

As in a first display pattern illustrated in FIG. 8, in a case where the operation mode of the external buzzer 7 is the enabled mode, the operation mode of the in-cab buzzer 23 is the enabled mode, and the control mode of the vehicle body operation control unit 58 is the enabled mode, the first symbol 35, the second symbol 36, and the third symbol 37 are displayed on the display device 22.

As in a second display pattern illustrated in FIG. 8, in a case where the operation mode of the external buzzer 7 is the disabled mode, the operation mode of the in-cab buzzer 23 is the enabled mode, and the control mode of the vehicle body operation control unit 58 is the enabled mode, the first symbol 35 is not displayed on the display device 22, and the second symbol 36 and the third symbol 37 are displayed on the display device 22.

As in a third display pattern illustrated in FIG. 8, in a case where the operation mode of the external buzzer 7 is the enabled mode, the operation mode of the in-cab buzzer 23 is the enabled mode, and the control mode of the vehicle body operation control unit 58 is the disabled mode, the third symbol 37 is not displayed on the display device 22, and the first symbol 35 and the second symbol 36 are displayed on the display device 22.

As in a fourth display pattern illustrated in FIG. 8, in a case where the operation mode of the external buzzer 7 is the disabled mode, the operation mode of the in-cab buzzer 23 is the enabled mode, and the control mode of the vehicle body operation control unit 58 is the disabled mode, the first symbol 35 and the third symbol 37 are not displayed on the display device 22, and the second symbol 36 is displayed on the display device 22.

Figure 9:
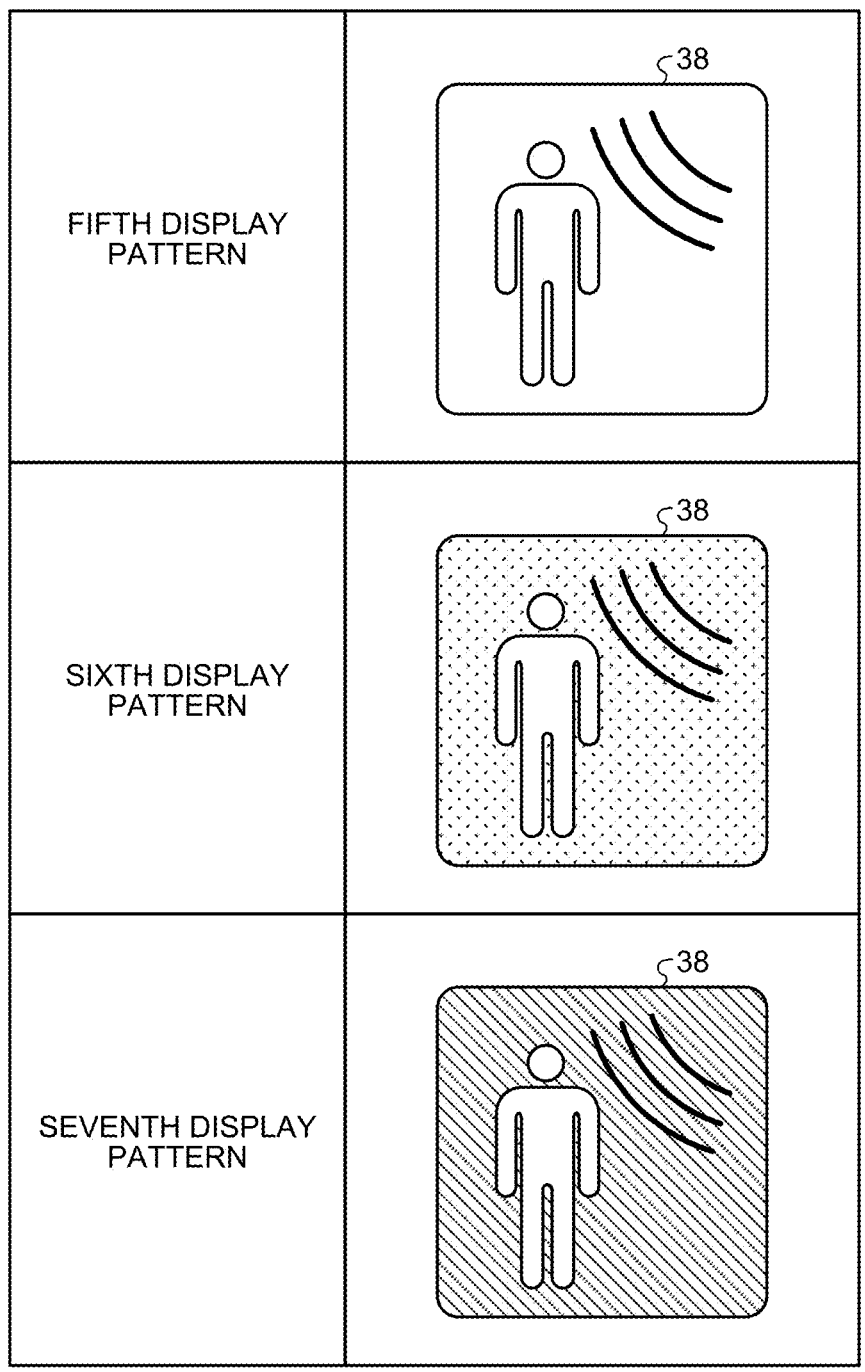
FIG. 9 is a diagram illustrating exemplary display of a display device according to the embodiment.

FIG. 9 is a diagram illustrating exemplary display of the display device 22 according to the embodiment. As illustrated in FIGS. 4, 7, and 9, the display control unit 59 causes the display device 22 to display the fourth symbol 38 indicating the object detection status by the object detection unit 51.

In a case where no person is detected in the alarm areas 14 as in a fifth display pattern illustrated in FIG. 9, the fourth symbol 38 is displayed in a first color. The first color is exemplified by green.

In a case where a person present inside the first alarm area 14A and outside the second alarm area 14B is detected as in a sixth display pattern illustrated in FIG. 9, the fourth symbol 38 is displayed in a second color. The second color is exemplified by yellow.

In a case where a person present inside the second alarm area 14B is detected as in a seventh display pattern illustrated in FIG. 9, the fourth symbol 38 is displayed in a third color. The third color is exemplified by red.

[Forced Setting Unit]

Figures 10, 11:
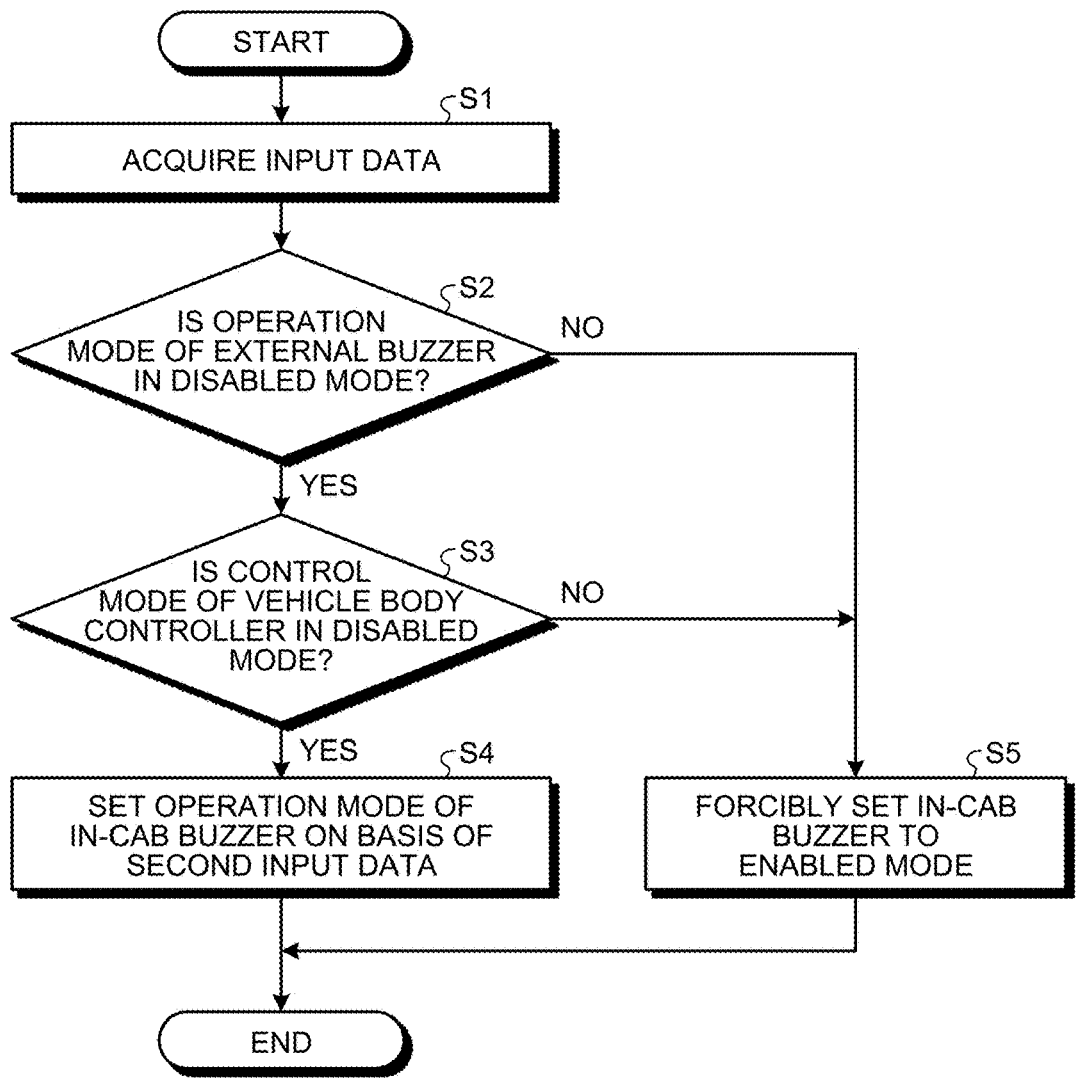
FIG. 10 is a table for explaining processing of a forced setting unit according to the embodiment.
FIG. 11 is a flowchart illustrating a surroundings monitoring method of the excavator according to the embodiment.

FIG. 10 is a table for explaining processing of the forced setting unit 55 according to the embodiment. In the embodiment, the forced setting unit 55 determines permission or prohibition of setting of the operation mode of the in-cab buzzer 23 by the operator on the basis of the operation mode of the external buzzer 7 and the operation mode of the vehicle body operation control unit 58. The operator can set the operation mode of the in-cab buzzer 23 by operating the input device 21. The operator alarm setting unit 53 sets the operation mode of the in-cab buzzer 23 on the basis of the second input data db from the input device 21. Permitting or prohibiting setting of the operation mode of the in-cab buzzer 23 by the operator includes permitting or prohibiting setting of the operation mode of the in-cab buzzer 23 by the operator alarm setting unit 53.

As illustrated in FIG. 10, in a case where the operation mode of the external buzzer 7 is set to the enabled mode on the basis of the first input data Da, the forced setting unit 55 prohibits setting of the operation mode of the in-cab buzzer 23 by the operator alarm setting unit 53. That is, the forced setting unit 55 prohibits setting of the operation mode of the in-cab buzzer 23 on the basis of the second input data db. The forced setting unit 55 forcibly sets the operation mode of the in-cab buzzer 23 to the enabled mode in a case where the operation mode of the external buzzer 7 is set to the enabled mode on the basis of the first input data Da.

Moreover, in a case where the control mode of the vehicle body operation control unit 58 is set to the enabled mode on the basis of the third input data Dc, the forced setting unit 55 prohibits setting of the operation mode of the in-cab buzzer 23 by the operator alarm setting unit 53. That is, the forced setting unit 55 prohibits setting of the operation mode of the in-cab buzzer 23 on the basis of the second input data db. The forced setting unit 55 forcibly sets the operation mode of the in-cab buzzer 23 to the enabled mode in a case where the control mode of the vehicle body operation control unit 58 is set to the enabled mode on the basis of the third input data Dc.

That is, in the embodiment, in a case where one or both of the operation mode of the external buzzer 7 and the control mode of the vehicle body operation control unit 58 are set to the enabled mode, setting of the operation mode of the in-cab buzzer 23 by the operator alarm setting unit 53 is prohibited, and the operation mode of the in-cab buzzer 23 is forcibly set to the enabled mode.

Note that the forced setting unit 55 may prohibit the operator alarm setting unit 53 from acquiring the second input data db in a case where one or both of the operation mode of the external buzzer 7 and the control mode of the vehicle body operation control unit 58 are set to the enabled mode. That is, the operator alarm setting unit 53 may be set not to accept the second input data db. The forced setting unit 55 may invalidate the second input data db acquired by the operator alarm setting unit 53.

Meanwhile, in a case where the operation mode of the external buzzer 7 is set to the disabled mode and the control mode of the vehicle body operation control unit 58 is set to the disabled mode on the basis of the first input data Da and the third input data Dc, the forced setting unit 55 allows the operator alarm setting unit 53 to set the operation mode of the in-cab buzzer 23. That is, in a case where both the operation mode of the external buzzer 7 and the control mode of the vehicle body operation control unit 58 are set to the disabled mode on the basis of the first input data Da and the third input data Dc, the forced setting unit 55 allows the operation mode of the in-cab buzzer 23 to be set on the basis of the second input data db. The operation mode of the in-cab buzzer 23 is set by the operator. The operation mode of the in-cab buzzer 23 is set to either the enabled mode or the disabled mode on the basis of the second input data db.

Note that the forced setting unit 55 may allow the operator alarm setting unit 53 to acquire the second input data db in a case where the operation mode of the external buzzer 7 is set to the disabled mode and the control mode of the vehicle body operation control unit 58 is set to the disabled mode. That is, in a case where acquisition of the second input data db is prohibited, the forced setting unit 55 may set the operator alarm setting unit 53 to accept the second input data db. In addition, the forced setting unit 55 may validate the second input data db acquired by the operator alarm setting unit 53.

[Surroundings Monitoring Method]

FIG. 11 is a flowchart illustrating a surroundings monitoring method of the excavator 1 according to the embodiment. In a case where the surroundings of the excavator 1 are monitored by the surroundings monitoring system 50, the operation mode of the external buzzer 7, the operation mode of the in-cab buzzer 23, and the control mode of the vehicle body operation control unit 58 are set by the operator. The operator can set each of the operation mode of the external buzzer 7, the operation mode of the in-cab buzzer 23, and the control mode of the vehicle body operation control unit 58 by operating the input device 21.

Figure 12:
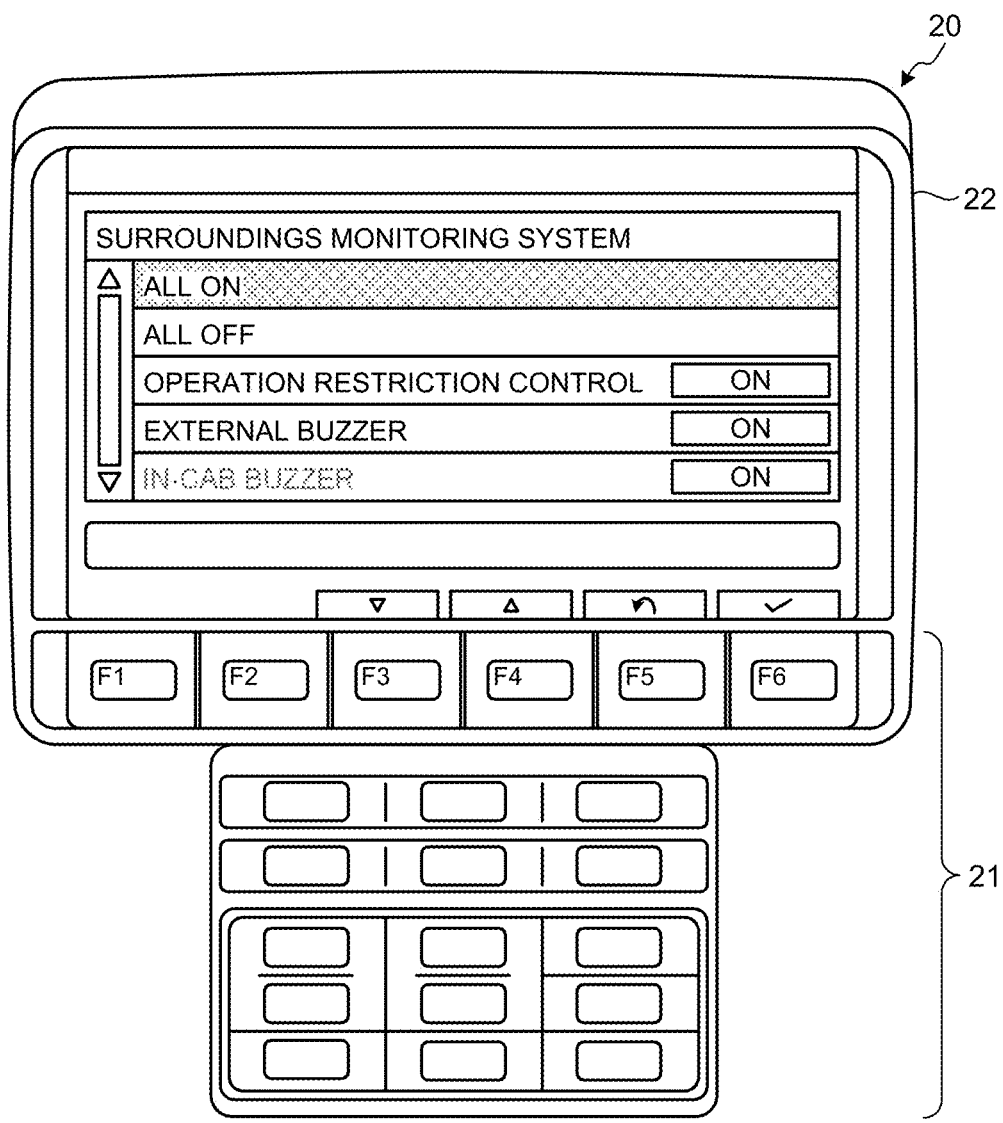
FIG. 12 is a diagram illustrating exemplary display of a display device according to the embodiment.

FIG. 12 is a diagram illustrating exemplary display of the display device 22 according to the embodiment. As illustrated in FIG. 12, the display control unit 59 causes the display device 22 to display a setting menu in order to assist the operator in setting the operation mode of the external buzzer 7, the operation mode of the in-cab buzzer 23, and the control mode of the vehicle body operation control unit 58. The setting menu is displayed data related to setting of each of the operation mode of the external buzzer 7, the operation mode of the in-cab buzzer 23, and the control mode of the vehicle body operation control unit 58.

Characters of "All ON", "All OFF", "Operation Restriction Control", "External Buzzer", and "In-Cab Buzzer" are each displayed as the setting menu.

In the example illustrated in FIG. 12, the operator can set each of the operation mode of the external buzzer 7, the operation mode of the in-cab buzzer 23, and the control mode of the vehicle body controller 8 to the enabled mode by operating the input device 21 in a state where "All ON" is selected. The operator can set each of the operation mode of the external buzzer 7, the operation mode of the in-cab buzzer 23, and the control mode of the vehicle body controller 8 to the disabled mode by operating the input device 21 in a state where "All OFF" is selected.

The operator can set the control mode of the vehicle body operation control unit 58 by operating the input device 21 in a state where the "Operation Restriction Control" is selected. With the input device 21 operated in a state where the "Operation Restriction Control" is selected, the third input data Dc is generated. The operator operates the input device 21 to set "Operation Restriction Control" to either ON or OFF. When the "Operation Restriction Control" is set to ON, the third input data Dc for setting the control mode of the vehicle body operation control unit 58 to the enabled mode is generated. When the "Operation Restriction Control" is set to OFF, the third input data Dc for setting the control mode of the vehicle body operation control unit 58 to the disabled mode is generated.

The operator can set the operation mode of the external buzzer 7 by operating the input device 21 in a state where "External Buzzer" is selected. With the input device 21 operated in a state where the "External Buzzer" is selected, the first input data Da is generated. The operator operates the input device 21 to set the "External Buzzer" to either ON or OFF. When the "External Buzzer" is set to ON, the first input data Da for setting the operation mode of the external buzzer 7 to the enabled mode is generated. When the "External Buzzer" is set to OFF, the first input data Da for setting the operation mode of the external buzzer 7 to the disabled mode is generated.

The operator can set the operation mode of the in-cab buzzer 23 by operating the input device 21 in a state where "In-Cab Buzzer" is selected. With the input device 21 operated in a state where the "In-Cab Buzzer" is selected, the second input data db is generated. The operator operates the input device 21 to set the "In-Cab Buzzer" to either ON or OFF. When the "In-Cab Buzzer" is set to ON, the second input data db for setting the operation mode of the in-cab buzzer 23 to the enabled mode is generated. When the "In-Cab Buzzer" is set to OFF, the second input data db for setting the operation mode of the in-cab buzzer 23 to the disabled mode is generated.

The external alarm setting unit 52 acquires the first input data Da. The operator alarm setting unit 53 acquires the second input data db. The vehicle body operation setting unit 54 acquires the third input data Dc (step S1).

The external alarm setting unit 52 determines whether or not the first input data Da acquired in step S1 is the first input data Da for setting the operation mode of the external buzzer 7 to the disabled mode. That is, the external alarm setting unit 52 determines whether or not the operator has set the operation mode of the external buzzer 7 to the disabled mode (step S2).

The vehicle body operation setting unit 54 determines whether or not the third input data Dc acquired in step S1 is the third input data Dc for setting the control mode of the vehicle body operation control unit 58 to the disabled mode. That is, the vehicle body operation setting unit 54 determines whether or not the operator has set the control mode of the vehicle body operation control unit 58 to the disabled mode (step S3).

If it is determined in step S2 that the operation mode of the external buzzer 7 is set to the disabled mode (step S2: Yes), and if it is determined in step S3 that the control mode of the vehicle body operation control unit 58 is set to the disabled mode (step S3: Yes), the operator alarm setting unit 53 sets the operation mode of the in-cab buzzer 23 on the basis of the second input data db acquired in step S1 (step S4).

If it is determined in step S2 that the operation mode of the external buzzer 7 is set to the enabled mode (step S2: No), or if it is determined in step S3 that the control mode of the vehicle body operation control unit 58 is set to the enabled mode (step S3: No), the forced setting unit 55 forcibly sets the operation mode of the in-cab buzzer 23 to the enabled mode (step S5).

In the embodiment, the display control unit 59 makes the display form of the setting menu related to the operation mode of the in-cab buzzer 23 different between the case where the operation mode of the external buzzer 7 is set to the enabled mode and the case where the operation mode of the external buzzer 7 is set to the disabled mode. In addition, the display control unit 59 makes the display form of the setting menu related to the operation mode of the in-cab buzzer 23 different between the case where the control mode of the vehicle body operation control unit 58 is set to the enabled mode and the case where the control mode is set to the disabled mode. In the example illustrated in FIG. 12, the display form of the setting menu related to the operation mode of the in-cab buzzer 23 includes the display form of the characters of "In-Cab Buzzer".

As illustrated in FIG. 12, in a case where at least one of the operation mode of the external buzzer 7 or the control mode of the vehicle body operation control unit 58 is set to the enabled mode and the operation mode of the in-cab buzzer 23 is forcibly set to the enabled mode on the basis of the first input data Da and the third input data Dc, the display control unit 59 deletes the characters of "In-Cab Buzzer" from the display device 22. Furthermore, in a case where at least one of the operation mode of the external buzzer 7 or the control mode of the vehicle body operation control unit 58 is set to the enabled mode and the operation mode of the in-cab buzzer 23 is forcibly set to the enabled mode on the basis of the first input data Da and the third input data Dc on the basis of the first input data Da and the third input data Dc, the forced setting unit 55 prohibits acquisition of the second input data db by the operator alarm setting unit 53.

Meanwhile, in a case where both the operation mode of the external buzzer 7 and the control mode of the vehicle body operation control unit 58 are set to the disabled mode on the basis of the first input data Da and the third input data Dc, the display control unit 59 causes the display device 22 to display the characters of "In-Cab Buzzer". Furthermore, in a case where both the operation mode of the external buzzer 7 and the control mode of the vehicle body operation control unit 58 are set to the disabled mode on the basis of the first input data Da and the third input data Dc, the forced setting unit 55 allows the operator alarm setting unit 53 to acquire the second input data db.

For example, in the setting menu illustrated in FIG. 12, in a case where the operator sets ON or OFF to "Operation Restriction Control", "External Buzzer", and "In-Cab Buzzer" in the order mentioned, in a case where either "Operation Restriction Control" or "External Buzzer" is set to ON, the characters of "In-Cab Buzzer" are deleted, and acceptance of the second input data db by the operator alarm setting unit 53 is prohibited.

In addition, in the setting menu illustrated in FIG. 12, in a case where the operator sets ON or OFF to "In-Cab Buzzer", "Operation Restriction Control", and "External Buzzer" in the order mentioned, in a case where either "Operation Restriction Control" or "External Buzzer" is set ON even if "In-Cab Buzzer" is set OFF, the forced setting unit 55 invalidates the second input data db, deletes the characters of the "In-Cab Buzzer", and prohibits acceptance of the second input data db by the operator alarm setting unit 53.

[Computer System]

Figure 13:
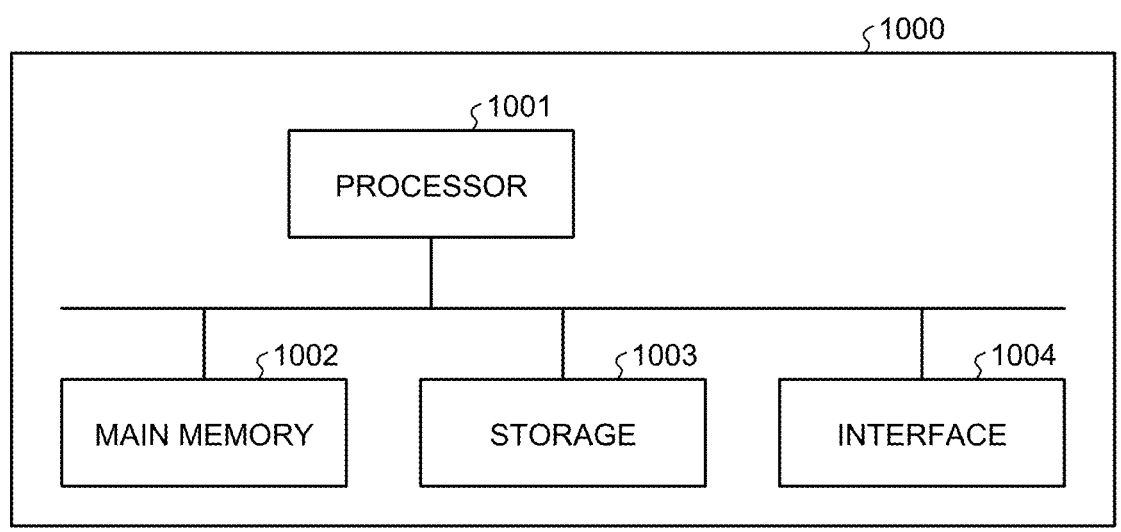
FIG. 13 is a block diagram illustrating a computer system according to the embodiment.

FIG. 13 is a block diagram illustrating a computer system 1000 according to the embodiment. The surroundings monitoring controller 24 described above includes the computer system 1000. The computer system 1000 includes a processor 1001 such as a central processing unit (CPU), a main memory 1002 including a nonvolatile memory such as a read only memory (ROM) and a volatile memory such as a random access memory (RAM), a storage 1003, and an interface 1004 including an input and output circuit. The function of the surroundings monitoring controller 24 is stored in the storage 1003 as a computer program. The processor 1001 reads the computer program from the storage 1003, loads the computer program in the main memory 1002, and executes the above-described processing in accordance with the computer program. That is, the processor 1001 executes the processing of the object detection unit 51, the external alarm setting unit 52, the operator alarm setting unit 53, the vehicle body operation setting unit 54, the forced setting unit 55, the operator alarm control unit, and the display control unit 59 of the surroundings monitoring controller 24. Note that the computer program may be distributed to the computer system 1000 via a network.

According to the embodiment described above, the computer program or the computer system 1000 can detect an object around the excavator 1 having the cab 9, set the operation mode of the external buzzer 7 disposed outside the cab 9 at the time when an object is detected to either the enabled mode in which an alarm is output or the disabled mode in which the alarm is not output on the basis of the first input data Da, and enable or disable the operator alarm device on the basis of the operation mode of the external alarm device that has been set. The computer program or the computer system 1000 can further set the operation mode of the in-cab buzzer 23 disposed inside the cab 9 at the time when an object is detected to either the enabled mode in which the alarm is output or the disabled mode in which the alarm is not output on the basis of the second input data db and, in a case where the operation mode of the external buzzer 7 is set to the enabled mode, prohibit setting of the operation mode of the in-cab buzzer 23 by the second input data db and forcibly set the operation mode of the in-cab buzzer 23 to the enabled mode.

[Effects]

As described above, according to the embodiment, the surroundings monitoring system 50 of the excavator 1 includes the object detection device 6 that detects an object around the excavator 1, the in-cab buzzer 23 disposed inside the cab 9, the vehicle body operation setting unit 54 that sets, on the basis of the third input data Dc from the input device 21, the control mode for controlling the operation of the work machine 21 when an object is detected to either the enabled mode in which the operation of at least a part of the work machine is restricted and the disabled mode in which there is no restriction, and the operator alarm setting unit 53 that executes processing of enabling or disabling the in-cab buzzer 23 on the basis of the control mode that has been set. The processing of the operator alarm setting unit 53 and the object body operation setting unit 54 is executed by processing of the processor 1001.

As a result, on the basis of the operation mode, by controlling the setting of the enabled mode and the disabled mode of the in-cab buzzer 24, each of the operation mode of the external buzzer 7 and the operation mode of the in-cab buzzer 23 is avoided from being improperly set.

In a case where the control mode is set to the enabled mode, the operator alarm setting unit 53 enables the in-cab buzzer. Inappropriate setting of the operation mode of the in-cab buzzer 23 is suppressed.

The surroundings monitoring system 50 of the excavator 1 includes the external alarm setting unit 52 that sets the operation mode of the external buzzer 7 at the time when an object is detected to either the enabled mode in which the alarm is output or the disabled mode in which the alarm is not output on the basis of the second input data db, and the forced setting unit 55 does not acquire the second input data db in a case where the control mode is set to the enabled mode. Since acceptance of the second input data db by the surroundings monitoring controller 24 is prohibited, in a case where the control mode is set to the enabled mode, the operation mode of the in-cab buzzer 23 is set to the enabled mode by the surroundings monitoring controller 24 even if the operator operates the input device 21 in such a manner that the operation mode of the in-cab buzzer 23 is set to the disabled mode.

The surroundings monitoring system 50 of the excavator 1 includes: the external buzzer 7 disposed outside the cab 9; and the external alarm setting unit 52 that sets the operation mode of the external buzzer 7 at the time when an object is detected to either the enabled mode in which the alarm is output or the disabled mode in which no alarm is output on the basis of the first input data Da from the input device 21, and the operator alarm setting unit 53 executes processing of enabling or disabling the in-cab buzzer 23 on the basis of the operation mode of the external buzzer 7 that has been set.

As a result, in a case where the operator can desirably set the operation mode of each of the external buzzer 7 and the in-cab buzzer 23 to either the enabled mode or the disabled mode, in a case where the operation mode of the external buzzer 7 is set to the enabled mode, the operation mode of the in-cab buzzer 23 is set to the enabled mode by the surroundings monitoring controller 24 even if the operator tries to set the operation mode of the in-cab buzzer 23 to the disabled mode. Therefore, inappropriate setting of each of the operation mode of the external buzzer 7 and the operation mode of the in-cab buzzer 23 is suppressed.

In a case where the operation mode of the external buzzer 7 is set to the enabled mode, the operator alarm setting unit 53 enables the in-cab buzzer 23. Inappropriate setting of the operation mode of the in-cab buzzer 23 is suppressed.

The operator alarm setting unit 53 sets the operation mode of the in-cab buzzer 23 at the time when an object is detected to either the enabled mode in which the alarm is output or the disabled mode in which the alarm is not output on the basis of the second input data db from the input device 21, and the forced setting unit 55 does not acquire the second input data db in a case where the operation mode of the external buzzer 7 is set to the enabled mode. Since acceptance of the second input data db by the surroundings monitoring controller 24 is prohibited, in a case where the operation mode of the external buzzer 7 is set to the enabled mode, the operation mode of the in-cab buzzer 23 is set to the enabled mode by the surroundings monitoring controller 24 even if the operator operates the input device 21 in such a manner that the operation mode of the in-cab buzzer 23 is set to the disabled mode.

The surroundings monitoring system 50 of the excavator 1 includes the vehicle body operation control unit 58 that controls the operation of the excavator 1 on the basis of the operation of the operation devices 12 and the vehicle body operation setting unit 54 that sets the control mode of the vehicle body operation control unit 58 at the time when an object is detected to the enabled mode in which the operation of at least a part of the excavator 1 is restricted or the disabled mode in which the operation is not restricted based on the third input data Dc from the input device 21. In a case where the control mode of the vehicle body operation control unit 58 is set to the enabled mode, the forced setting unit 55 prohibits setting of the operation mode of the in-cab buzzer 23 by the operator alarm setting unit 53 and sets the operation mode of the in-cab buzzer 23 to the enabled mode.

As a result, in a case where the operator can desirably set the operation mode of the vehicle body operation control unit 58 to either the enabled mode or the disabled mode, in a case where the control mode of the vehicle body operation control unit 58 is set to the enabled mode, the control mode of the vehicle body controller 8 is set to the enabled mode by the surroundings monitoring controller 24 even if the operator tries to set the operation mode of the in-cab buzzer 23 to the disabled mode. Therefore, inappropriate setting of the operation mode of the in-cab buzzer 23 is suppressed.

The operator alarm setting unit 53 sets the operation mode of the in-cab buzzer 23 at the time when an object is detected to either the enabled mode in which the alarm is output or the disabled mode in which the alarm is not output on the basis of the second input data db from the input device 21, and the forced setting unit 55 does not acquire the second input data db at the operator alarm setting unit 53 in a case where the control mode of the vehicle body operation control unit 58 is set to the enabled mode. That is, acquisition of the second input data db by the operator alarm setting unit 53 is prohibited. Since acceptance of the second input data db by the surroundings monitoring controller 24 is prohibited, in a case where the control mode of the vehicle body controller 8 is set to the enabled mode, the operation mode of the in-cab buzzer 23 is set to the enabled mode by the surroundings monitoring controller 24 even if the operator operates the input device 21 in such a manner that the operation mode of the in-cab buzzer 23 is set to the disabled mode.

The forced setting unit 55 allows the operator alarm setting unit 53 to acquire the second input data db in a case where the operation mode of the external buzzer 7 is set to the disabled mode and the control mode of the vehicle body operation control unit 58 is set to the disabled mode. As a result, in the case where both the operation mode of the external buzzer 7 and the control mode of the vehicle body operation control unit 58 are set to the disabled mode, the operator can desirably set the operation mode of the in-cab buzzer 23 by operating the input device 21.

The operator alarm setting unit 53 sets the operation mode of the in-cab buzzer 23 at the time when an object is detected to either the enabled mode in which the alarm is output or the disabled mode in which the alarm is not output on the basis of the second input data db from the input device 21, and the forced setting unit 55 acquires the second input data db by the operator alarm setting unit 53 in a case where the operation mode of the external buzzer 7 is set to the disabled mode and the control mode of the vehicle body operation control unit 58 for controlling the operation of the work machine is set to the disabled mode. As a result, since acceptance of the second input data db by the surroundings monitoring controller 24 is allowed, the operator can desirably set the operation mode of the in-cab buzzer 23 by operating the input device 21.

The surroundings monitoring system 50 of the excavator 1 includes the display control unit 59 that causes the display device 22 to display the setting menu related to settings of each of the operation mode of the external buzzer 7 and the operation mode of the in-cab buzzer 23. The display control unit 59 makes the display form of the setting menu related to the operation mode of the in-cab buzzer 23 different between the case where at least one of the operation mode of the external buzzer 7 or the control mode of the vehicle body operation control unit 58 is set to the enabled mode and the case where both the operation mode of the external buzzer 7 and the control mode of the vehicle body operation control unit 58 are set to the disabled mode. As described by referring to FIG. 12, in the embodiment, the setting menu related to the operation mode of the in-cab buzzer 23 includes the characters of "In-Cab Buzzer". In the case where at least one of the operation mode of the external buzzer 7 or the control mode of the vehicle body operation control unit 58 is set to the enabled mode, the characters "In-Cab Buzzer" are hidden. In the case where both the operation mode of the external buzzer 7 and the control mode of the vehicle body operation control unit 58 are set to the disabled mode, the characters of "In-Cab Buzzer" are displayed. As a result, the operator can recognize whether or not the operation mode of the in-cab buzzer 23 can be set by the input device 21.

The display control unit 59 causes the display device 22 to display the first symbol 35 indicating the operation mode of the external buzzer 7, the second symbol 36 indicating the operation mode of the in-cab buzzer 23, and the third symbol 37 indicating the control mode of the vehicle body operation control unit 58. As a result, the operator can recognize the setting status of the operation mode of the external buzzer 7, the setting status of the operation mode of the in-cab buzzer 23, and the setting status of the control mode of the vehicle body operation control unit 58.

The surroundings monitoring system 50 of the excavator 1 includes the alarm area storage unit 60 that stores the alarm areas 14 in which output of the alarm is requested when an object is detected. The display control unit 59 causes the display device 22 to display the surroundings images 30 indicating the surroundings of the excavator 1 and the reference lines 33 indicating the alarm areas 14 in the surroundings images 30. As a result, the operator can recognize the positional relationship between the excavator 1 and the alarm areas 14.

OTHER EMBODIMENTS

In the above-described embodiment, the external alarm device 7 is an external buzzer that outputs alarm sound as an alarm; however, it is not limited thereto. For example, the external alarm device 7 may be an alarm lamp or a rotating lamp that outputs light as an alarm.

In the above-described embodiment, the operator alarm device 23 is an in-cab buzzer that outputs alarm sound as an alarm; however, it is not limited thereto. For example, the operator alarm device 23 may be an alarm lamp or a rotating lamp that outputs light as an alarm or may be a display device that displays a message or a symbol as an alarm.

In the above-described embodiment, the object detection device 6 includes the cameras 11; however, it is not limited thereto. The object detection device 6 is only required to detect an object in a contactless manner, and for example, the object detection device 6 may be a radar device or a laser device provided to the excavator 1.

In the above-described embodiment, the operation modes and the control mode are set by operating the buttons of the input device 21; however, it is not limited thereto. The input device 21 may include a touch sensor included in the display screen of the display device 22. That is, the display device 22 may include a touch panel having the function of the input device 21. The operation modes and the control mode may be set by operating the touch panel.

In the embodiment described above, the characters of "In-Cab Buzzer" are switched between a hidden state and a displayed state on the display device 22 between the case where at least one of the operation mode of the external buzzer 7 or the control mode of the vehicle body operation control unit 58 is set to the enabled mode and the case where both the operation mode of the external buzzer 7 and the control mode of the vehicle body operation control unit 58 are set to the disabled mode; however, it is not limited thereto. For example, the display control unit 59 is only required to make the display form of the setting menu related to the operation mode of the in-cab buzzer 23 different between the case where at least one of the operation mode of the external buzzer 7 or the control mode of the vehicle body operation control unit 58 is set to the enabled mode and the case where both the operation mode of the external buzzer 7 and the control mode of the vehicle body operation control unit 58 are set to the disabled mode. For example, in the case where at least one of the operation mode of the external buzzer 7 or the control mode of the vehicle body operation control unit 58 is set to the enabled mode, the characters of "In-Cab Buzzer" may be displayed in red, and in the case where both the operation mode of the external buzzer 7 and the control mode of the vehicle body operation control unit 58 are set to the disabled mode, the characters of "In-Cab Buzzer" may be displayed in blue.

In the embodiment, the surroundings monitoring monitor 20 includes the input device 21, the display device 22, the in-cab buzzer 23, and the surroundings monitoring controller 24; however, it is not limited thereto. For example, the input device 21, the display device 22, the in-cab buzzer 23, and the surroundings monitoring controller 24 may be separate bodies. In addition, a tablet terminal separable from the excavator 1 may have the function of the input device 21, the function of the display device 22, and the function of the surroundings monitoring controller 24.

In the embodiment, the surroundings monitoring controller 24 has functions of each of the object detection unit 51, the external alarm setting unit 52, the operator alarm setting unit 53, the vehicle body operation setting unit 54, the forced setting unit 55, the operator alarm control unit 57, the display control unit 59, and the alarm area storage unit 60, and the vehicle body controller 8 has functions of each of the external alarm control unit 56 and the vehicle body operation control unit 58; however, it is not limited thereto. For example, at least some of the functions of the surroundings monitoring controller 24 may be included in the vehicle body controller 8, or at least some of the functions of the vehicle body controller 8 may be included in the surroundings monitoring controller 24. Alternatively, the surroundings monitoring controller 24 and the vehicle body controller 8 may be integrated. Further alternatively, each of the object detection unit 51, the external alarm setting unit 52, the operator alarm setting unit 53, the vehicle body operation setting unit 54, the forced setting unit 55, the external alarm control unit 56, the operator alarm control unit 57, the vehicle body operation control unit 58, the display control unit 59, and the alarm area storage unit 60 may be configured by separate pieces of hardware (computer systems).

In the above-described embodiment, the excavator 1 may be an excavator used in mines or an excavator used at construction sites.

In the above-described embodiment, the work machine 1 is an excavator; however, it is not limited thereto. The work machine 1 only needs to have a working equipment, and for example, the work machine 1 may be a bulldozer or a wheel loader. Alternatively, the work machine 1 may be a dump truck having a vessel instead of the working equipment. The surroundings monitoring system 50 according to the embodiment can be applied to various work machines 1.

In the embodiment, the work machine 1 is operated by the operator onboard the cab 9; however, it is not limited thereto. The work machine 1 may be remotely operated by an operator at a remote location. For example, an operator may operate the work machine 1 from an operation room provided at a distance from the work machine 1. In this case, the operator alarm device 23 is disposed in the operation room in order to output an alarm to the operator operating the work machine.

REFERENCE SIGNS LIST

1 EXCAVATOR (WORK MACHINE)
1S VEHICLE BODY SYMBOL
2 UPPER SWING BODY
3 LOWER TRAVELLING BODY
3A DRIVING WHEEL
3B CRAWLER BELT
4 WORKING EQUIPMENT
4A BOOM
4B ARM
4C BUCKET
5 HYDRAULIC CYLINDER
5A BOOM CYLINDER
5B ARM CYLINDER
5C BUCKET CYLINDER
6 OBJECT DETECTION DEVICE
7 EXTERNAL BUZZER (EXTERNAL ALARM DEVICE)
8 VEHICLE BODY CONTROLLER
9 CAB
10 DRIVER'S SEAT
11 CAMERA
11A REAR CAMERA
11B RIGHT SIDE CAMERA
11C RIGHT FRONT CAMERA
11D LEFT SIDE CAMERA
12 OPERATION DEVICE
12A LEFT WORKING LEVER
12B RIGHT WORKING LEVER
12C LEFT TRAVELLING LEVER
12D RIGHT TRAVELLING LEVER
12E LEFT FOOT PEDAL
12F RIGHT FOOT PEDAL
13 DETECTION AREA
14 ALARM AREA
14A FIRST ALARM AREA
14B SECOND ALARM AREA
15 OBJECT
16 MARKER
20 SURROUNDINGS MONITORING MONITOR
21 INPUT DEVICE
22 DISPLAY DEVICE
23 IN-CAB BUZZER (OPERATOR ALARM DEVICE)
24 SURROUNDINGS MONITORING CONTROLLER
30 SURROUNDINGS IMAGE
31 BIRD'S EYE IMAGE
32 SINGLE CAMERA IMAGE
33 REFERENCE LINE
33A FIRST REFERENCE LINE
33B SECOND REFERENCE LINE
34 STATE SYMBOL
34A WATER TEMPERATURE GAUGE
34B OIL TEMPERATURE GAUGE
34C FUEL LEVEL GAUGE
35 FIRST SYMBOL
36 SECOND SYMBOL
37 THIRD SYMBOL
38 FOURTH SYMBOL
39 DIRECTION SYMBOL
40 FUNCTION SYMBOL
40A FUNCTION SYMBOL
40B FUNCTION SYMBOL
40C FUNCTION SYMBOL
41 SERVICE METER SYMBOL
42 WORK MODE SYMBOL
50 SURROUNDINGS MONITORING SYSTEM
51 OBJECT DETECTION UNIT
52 EXTERNAL ALARM SETTING UNIT
53 OPERATOR ALARM SETTING UNIT
54 VEHICLE BODY OPERATION SETTING UNIT
55 FORCED SETTING UNIT
56 EXTERNAL ALARM CONTROL UNIT
57 OPERATOR ALARM CONTROL UNIT
58 VEHICLE BODY OPERATION CONTROL UNIT
59 DISPLAY CONTROL UNIT

60 ALARM AREA STORAGE UNIT
1000 COMPUTER SYSTEM
1001 PROCESSOR
1002 MAIN MEMORY
1003 STORAGE
1004 INTERFACE
AX BOOM ROTATION AXIS
BX ARM ROTATION AXIS
CX BUCKET ROTATION AXIS
Da FIRST INPUT DATA
db SECOND INPUT DATA
Dc THIRD INPUT DATA
RX SWINGING AXIS

The invention claimed is:

1. A surroundings monitoring system for a work machine, the surroundings monitoring system comprising:
an object detection device that detects an object around the work machine;
an operator alarm device disposed in such a manner as to output an alarm towards an operator operating the work machine; and
a processor,
wherein the processor:
sets, on the basis of input data for setting a control mode of the work machine from an input device, a control mode for controlling an operation of the work machine at a time when the object is detected to either an enabled mode in which at least a part of the operation of the work machine is restricted or a disabled mode in which the operation of the work machine is not restricted; and
enables or disables the operator alarm device on the basis of the control mode that has been set, wherein
the enabled mode comprises restricting at least one operation of the work machine based on an operation of operation devices provided in the work machine, the at least one operation being selected from the group consisting of: a swinging operation of the upper swing body, a travelling operation of the lower travelling body, and a working operation of the working equipment.

2. The surroundings monitoring system according to claim 1,
wherein the processor enables the operator alarm device in a case where the control mode is set to the enabled mode.

3. The surroundings monitoring system according to claim 1,
wherein the processor:
sets an operation mode of the operator alarm device at the time when the object is detected to either an enabled mode in which the alarm is output or a disabled mode in which the alarm is not output on the basis of input data for setting the operation mode of the operator alarm device from the input device; and
does not acquire the input data for setting the operation mode of the operator alarm device in a case where the control mode is set to the enabled mode.

4. The surroundings monitoring system according to claim 1, further comprising:
an external alarm device disposed in such a manner as to output an alarm towards an outside of the work machine,
wherein the processor:
sets an operation mode of the external alarm device at the time when the object is detected to either an enabled mode in which the alarm is output or a disabled mode in which the alarm is not output on the basis of input data for setting the operation mode of the external alarm device from the input device; and
enables or disables the operator alarm device on the basis of the operation mode of the external alarm device that has been set.

5. The surroundings monitoring system according to claim 4,
wherein the processor enables the operator alarm device in a case where the operation mode of the external alarm device is set to the enabled mode.

6. The surroundings monitoring system according to claim 4,
wherein the processor:
sets an operation mode of the operator alarm device at the time when the object is detected to either an enabled mode in which an alarm is output or a disabled mode in which the alarm is not output on the basis of input data for setting the operation mode of the operator alarm device from the input device; and
does not acquire the input data for setting the operation mode of the operator alarm device in a case where the operation mode of the external alarm device is set to the enabled mode.

7. The surroundings monitoring system according to claim 4,
wherein the processor disables the operator alarm device in a case where the control mode is set to the disabled mode and the operation mode of the external alarm device is set to the disabled mode.

8. The surroundings monitoring system according to claim 4,
wherein the processor:
sets an operation mode of the operator alarm device at the time when the object is detected to either an enabled mode in which the alarm is output or a disabled mode in which the alarm is not output on the basis of input data for setting the operation mode of the operator alarm device from the input device; and
acquires the input data for setting the operation mode of the operator alarm device in a case where the control mode is set to the disabled mode and the operation mode of the external alarm device is set to the disabled mode.

9. The surroundings monitoring system according to claim 1,
wherein the processor:
causes a display device to display a setting menu related to setting of each of the control mode and the operation mode of the operator alarm device; and
makes a display form of the setting menu related to the operation mode of the operator alarm device different between a case where the control mode is set to the enabled mode and a case where the control mode is set to the disabled mode.

10. The surroundings monitoring system according to claim 9,
wherein the processor causes the display device to display a first symbol indicating the control mode and a second symbol indicating the operation mode of the operator alarm device.

11. The surroundings monitoring system according to claim 9,
wherein the processor:
stores an alarm area in which the alarm is required to be output when the object is detected; and causes the display device to display a surroundings image indicating surroundings of the work machine and a reference line indicating the alarm area in the surroundings image.

12. A work machine comprising:
the surroundings monitoring system according to claim 1.

13. The work machine according to claim 12,
wherein the work machine comprises a cab, and
the operator alarm device is disposed inside the cab.

14. A surroundings monitoring method for a work machine, the surroundings monitoring method comprising:
detecting an object around the work machine;
setting, on the basis of input data for setting a control mode of the work machine, a control mode for controlling an operation of the work machine at a time when the object is detected to either an enabled mode in which at least a part of the operation of the work machine is restricted or a disabled mode in which the operation of the work machine is not restricted; and
enabling or disabling the operator alarm device on the basis of the control mode that has been set, wherein
the enabled mode comprises restricting at least one operation of the work machine based on an operation of operation devices provided in the work machine, the at least one operation being selected from the group consisting of: a swinging operation of the upper swing body, a travelling operation of the lower travelling body, and a working operation of the working equipment.

15. The surroundings monitoring method according to claim 14, further comprising:
setting an operation mode of an external alarm device at the time when the object is detected to either an enabled mode in which an alarm is output or a disabled mode in which the alarm is not output on the basis of input data for setting the operation mode of the external alarm device, the external alarm device being disposed in such a manner as to output the alarm towards an outside of the work machine; and
enabling or disabling the operator alarm device on the basis of the operation mode of the external alarm device that has been set.

16. A surroundings monitoring system for a work machine, the surroundings monitoring system comprising:
an object detection device that detects an object around the work machine;
an operator alarm device disposed in such a manner as to output an alarm towards an operator operating the work machine; and
a processor,
wherein the processor:
sets, on the basis of input data for setting a control mode of the work machine from an input device, a control mode for controlling an operation of the work machine at a time when the object is detected to either an enabled mode in which at least a part of the operation of the work machine is restricted or a disabled mode in which the operation of the work machine is not restricted; and
enables or disables the operator alarm device on the basis of the control mode that has been set.

* * * * *